US006051762A

United States Patent [19]

Fujiwara et al.

[11] Patent Number: 6,051,762

[45] Date of Patent: Apr. 18, 2000

[54] DATA CONVERTER FOR PRODUCING INDIVIDUAL MUSIC DATA FROM STANDARD MUSIC DATA ON THE BASIS OF THE INDIVIDUALITY OF AN AUTOMATIC PLAYER PIANO LEARNED BEFORE CONVERSION

[75] Inventors: Yuji Fujiwara; Yasuhiko Oba, both of Shizuoka, Japan

[73] Assignee: Yamaha Corporation, Hamamatsu, Japan

[21] Appl. No.: 09/026,537

[22] Filed: Feb. 19, 1998

[30] Foreign Application Priority Data

Feb. 21, 1997 [JP] Japan .................................... 9-038099

[51] Int. Cl.$^{7}$ ................................ G01F 1/02; G01F 5/00; G01F 3/04

[52] U.S. Cl. .................................. 84/21; 84/115; 84/461; 84/DIG. 7

[58] Field of Search ................................. 84/2, 3, 19–23, 84/115, DIG. 7, 461

[56] References Cited

U.S. PATENT DOCUMENTS

| | | | |
|---|---|---|---|
| 4,970,928 | 11/1990 | Tamaki | 84/21 |
| 5,451,708 | 9/1995 | Fujiwara et al. | 84/21 |
| 5,523,522 | 6/1996 | Koseki et al. | 84/21 |
| 5,652,399 | 7/1997 | Fujiwara et al. . | |
| 5,691,489 | 11/1997 | Fujiwara et al. | 84/21 |
| 5,731,530 | 3/1998 | Fujiwara et al. | 84/21 |

FOREIGN PATENT DOCUMENTS

| | | |
|---|---|---|
| 7-175471 | 7/1995 | Japan . |
| 7-175472 | 7/1995 | Japan . |
| 7-271355 | 10/1995 | Japan . |

*Primary Examiner*—Stanley J. Witkowski

*Attorney, Agent, or Firm*—Graham & James LLP

[57] ABSTRACT

An ideal automatic player piano is assumed to reproduce an original performance from fundamental data representative of a fundamental forward key trajectory and a backward key trajectory; however, if an actual automatic player piano reproduces a forward key trajectory and a backward key trajectory on the basis of the fundamental data, the forward key trajectory and the backward key trajectory do not faithfully reproduce the original key motions; for this reason, the actual automatic player piano learns first offset time at the end position and second offset time at an intermediate position between the end position and the rest position so as to determine a virtual forward key trajectory and a virtual backward key trajectory, and further learns first dead time around the rest position and second dead time around the rest position so as to exactly determining first starting time at the rest position and a second starting time at the end position, thereby moving keys along composite forward/backward trajectories for imparting a final hammer velocity to a hammer associated with the key to be moved in playback.

4 Claims, 18 Drawing Sheets

DATA CONVERTER FOR PRODUCING INDIVIDUAL MUSIC DATA FROM STANDARD MUSIC DATA ON THE BASIS OF THE INDIVIDUALITY OF AN AUTOMATIC PLAYER PIANO LEARNED BEFORE CONVERSION

FIELD OF THE INVENTION

This invention relates to an automatic player piano for playing a tune on a keyboard without fingering and, more particularly, to a data converter incorporated in the automatic player piano for exactly reproducing a key motion.

DESCRIPTION OF THE RELATED ART

An automatic player piano is broken down into an acoustic piano, a recording system and a playback system. Key sensors and hammer sensors are provided for the keys and the hammers both forming parts of the acoustic piano. The key sensors and the hammer sensors monitor the keys and the hammers, and a controller determines a key-on event, a key-off event, a key velocity and a hammer velocity on the basis of data signals supplied from the key sensors and the hammer sensors. The controller formats these pieces of music data information to music data codes, and stores them in a suitable memory unit. While the automatic player piano is reproducing the performance recorded in the memory unit, the controller sequentially reads out the music data codes so as to determine the lapse of time between the actuation of a key and the actuation of the next key, and regulates the key velocity. If the controller supplies the music data codes to another electronic musical instrument during the recording, the electronic musical instrument produces the performance in a real time manner.

Thus, the automatic playing system of the prior art automatic player piano downwardly moves the keys at suitable timings corresponding to the key-on events, and releases the keys at timings corresponding to the key-off events. However, such a simple controlling method can not reproduce delicate nuances expressed in the original performance, and an improvement is proposed in Japanese Patent Application No. 6-79604 by the present applicant. U.S. Ser. No. 08/407,771 was filed on Mar. 21, 1995 on the basis of the Japanese Patent Application, and is in the pending status. According to the Japanese patent Application, the controller previously determines a reference trajectory for each depressed key, and controls the key along the reference trajectory in the playback.

In order to control the key along the reference trajectory, the recording system memorizes a key depressing timing, an impact timing, a hammer velocity, a released timing, and a key velocity after the release, and the playback system restores the trajectory of the key from these pieces of music data information.

The key moved along the reference trajectory is expected to exactly reproduce the original hammer motion, and the hammer motion directly affects the sound to be produced. For this reason, in order to exactly reproduce the original hammer motion, the key is allowed to trace a different trajectory. For this reason, the prior art playback system previously studies how to impart the original hammer velocity at the impact timing. The prior art playback system sequentially actuates the keys before receiving an instruction for a playback. Namely, the prior art playback system determines the relation between the key motion and the hammer velocity at the impact timing, and produces pieces of control data information representative of the relation. The prior art playback system stores the pieces of control data information in a suitable memory. After the learning, the prior art automatic player piano becomes responsive to the instruction for a playback. When the prior art automatic player piano is instructed to reproduce an original performance, the playback system sequentially reads out the music data codes, and determines the reference trajectory for each key to be depressed. The playback system controls the key along the reference trajectory so as to impart the target hammer velocity to the associated hammer.

The learning is periodically repeated, because the automatic player piano is affected by the individuality and the aged deterioration. Moreover, the key is connected through a complicated key action mechanism to the hammer, and the key action mechanism does not linearly transfer the key motion to the hammer. For this reason, the prior art playback system carries out the learning under different key touches such as full stroke, repetition, relatively shallow half stroke, relatively deep half and so forth. The automatic playing system repeats the set of key touches for every key, and consumes a long time period. This is the first problem inherent in the automatic player piano disclosed in the Japanese Patent Application. Another problem is large memory capacity to store the large amount of music data obtained through the learning.

SUMMARY OF THE INVENTION

It is therefore an important object of the present invention to provide a data converter, which learns a relation between a key motion and a hammer motion within short time period.

In accordance with one aspect of the present invention, there is provided a data converter having certain converting characteristics from first music data representative of a performance to second music data available for a given automatic player piano, and the converting characteristics are defined by first sub-characteristics common to automatic player pianos and a second sub-characteristics unique to said given automatic player piano and obtained through a learning.

BRIEF DESCRIPTION OF THE DRAWINGS

The features and advantages of the data converter will be more clearly understood from the following description taken in conjunction with the accompanying drawings in which.

DESCRIPTION OF THE PREFERRED EMBODIMENT

Control Principle

1: Reference point

Figure 1A:
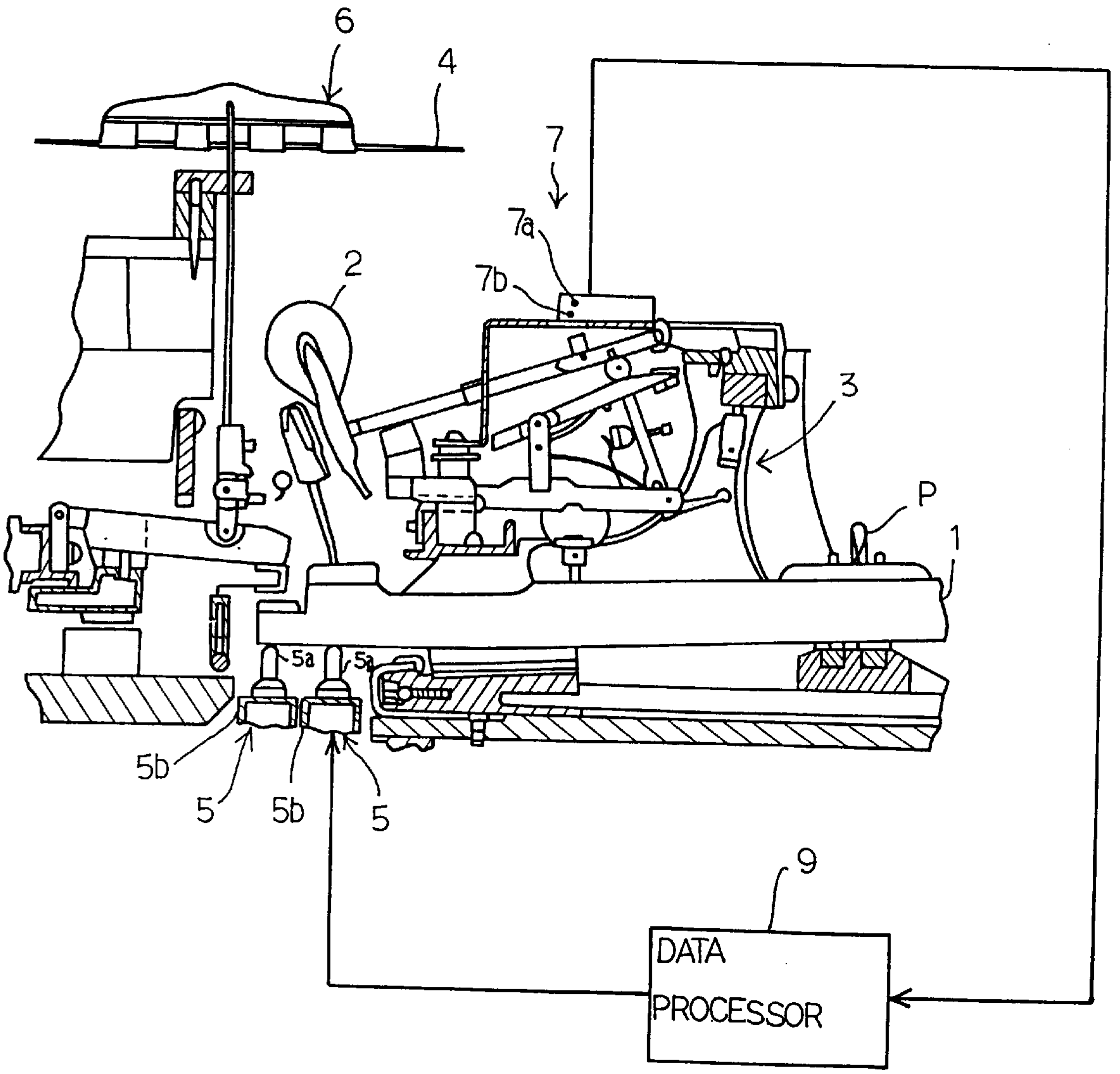
FIG. 1A is a schematic view showing the structure of an automatic player piano.
Figure 1B:
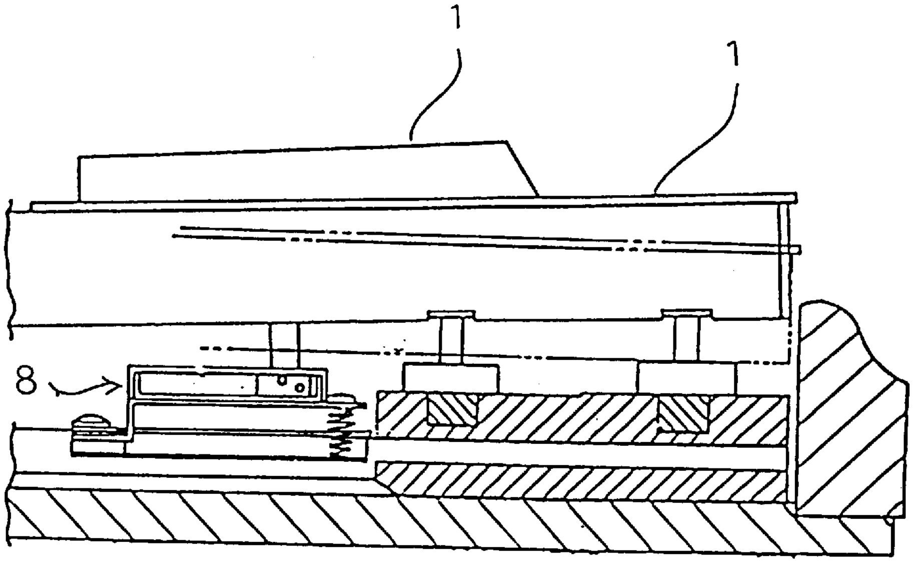
FIG. 1B is a partially cut-away side view showing solenoid-operated key actuators and a key sensor incorporated in the automatic player piano.

Description is firstly made on a controlling principle for an automatic player piano according to the present invention. FIGS. 1A and 1B illustrate an automatic player piano comprising a key 1, a hammer 2, a key action mechanism 3 functionally connected to the key 1 for driving the hammer 2, a set of strings 4 struck by the hammer 2, a solenoid-operated actuator 5 for rotating the key 1 instead of the player, a damper mechanism 6 for absorbing vibrations of the strings 4, a hammer sensor 7 for monitoring the hammer motion, a key sensor 8 for monitoring the key motion and a data processor 9 connected to the hammer sensor 7, the key sensor 8 and the solenoid-operated actuator 5.

When the solenoid-operated actuator 5 is energized, the plunger 5*a* upwardly projects from a yoke 5*b*, and rotates the key 1 from a rest position to an end position around a balance key pin P. The key 1 actuates the key action mechanism 3 and the damper mechanism 6. The damper mechanism 6 leaves the set of strings 4, and the key action mechanism 3 drives the hammer 2 for rotation.

The hammer 2 rebounds on the set of strings 4, and the damper 6 allows the set of strings to vibrate. When a key is stationary without a downward force, the key is staying in the rest position. On the other hand, when the depressed key 1 terminates the downward motion, the key 1 reaches the end position.

The key action mechanism 3, the hammer 2 and the damper mechanism 6 similarly behave in an original performance by a player, and the hammer sensor 7 and the key sensor 8 report a current hammer position and a current key position to the data processor 9.

The hammer sensor 7 is implemented by a pair of detectors 7*a* and 7*b* spaced along the trajectory of the hammer 2, and the detectors 7*a* and 7*b* determine respective timings when the hammer 2 intersects optical beams thereof. The data processor 9 counts a time interval between the two intersection, and calculates the hammer velocity VH on the basis of the time interval. The timing at the detector 7*a* is memorized as an impact time ti, and the hammer 2 strikes the set of strings 4 at the impact time ti. For this reason, the detector 7*a* is aligned with the rebounding point of the hammer 2.

The data processor 9 similarly determines the trajectory of each key 1 on the basis of detected timings reported by the key sensor 8.

In an original performance, the player may depress the key 1 at a constant speed or change the key velocity on the way from the rest position to the end position. The different key motions result in the difference of the impact of the associated hammer 2, and the sounds produced through the different hammer impacts give different impressions to a listener. Therefore, it is important to analyze a relation between the variation of the key velocity and the final hammer velocity VH, which is proportional to the strength of hammer impact.

In the following description, word "forward" means a direction from the rest position to the end position, and word "backward" means the opposite direction from the end position toward the rest position.

1-1: Reference Point

Using the automatic player piano shown in FIGS. 1A and 1B, the present inventors measured the key velocity and the final hammer velocity VH, and noticed that the final hammer velocity VH was explainable with a key velocity at a special point on the trajectory of the depressed key 1. Although the special point was variable not only among the piano models but also the individual products of the same model, the special points ranged between 9.0 millimeters and 9.5 millimeters under the rest positions. The present inventor concluded that the hammer impact was exactly reproducible by controlling a key 1 to have the key velocity in the original performance at the special point.

The special point is hereinbelow referred to "reference point Xr", and the key velocity at the reference point Xr is called "reference velocity Vr".

1-2: Reference Velocity

Figure 2:
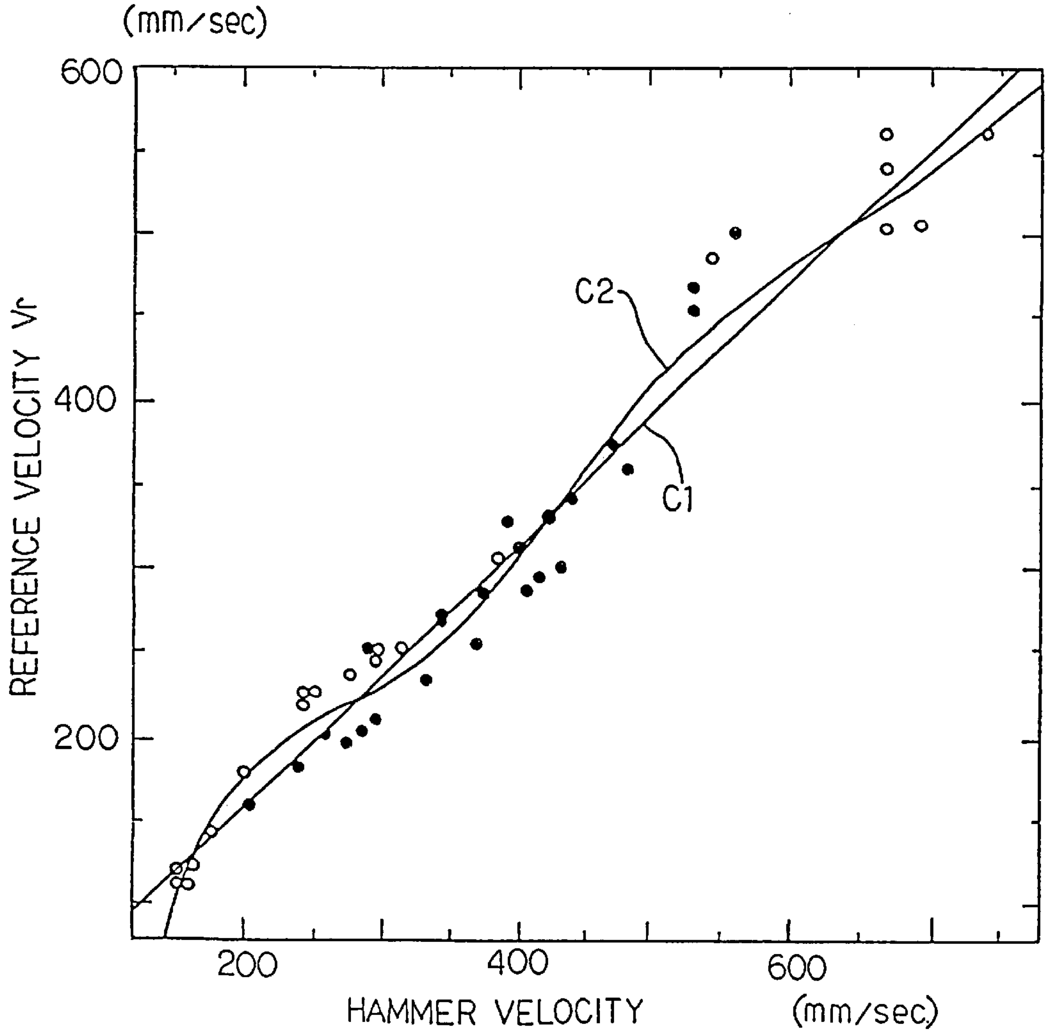
FIG. 2 is a graph showing a reference velocity in terms of a final hammer velocity.

The present inventors plotted the hammer velocity VH in terms of the reference velocity Vr in FIG. 2. The reference point Xr was set to 9.5 millimeters below the rest position. Bubbles stand for the hammer velocities measured in single full-stroke key motions each depressed from the rest position to the end position, and dots represent the hammer velocities measured in repetition where the key 1 returns toward the rest position before reaching the end position. C1 is indicative of the first-order least square approximation, and C2 is the sixth-order least square approximation.

As will be understood from FIG. 2, the relation between the reference velocity Vr and the final hammer velocity VH is well approximated by using the linear line C1 and the nonlinear line C2. Inversely, it is possible to determine the reference velocity Vr of a key 1 by using an impact data indicative of the final hammer velocity VH. The present inventors employ the linear line C1 indicative of the firstorder least square approximation, and the reference velocity Vr is calculated as follows.

$$Vr=alpha\times VH+beta \qquad \text{Equation 1}$$

where alpha and beta are constants.

The constants alpha and beta are determined through experiments using an actual automatic player piano. The constants alpha and beta are variable by changing the reference point Xr.

1-3: Reference Time Interval

A reference time tr is necessary for the exactly reproduced key motion. The reference time tr is defined as a time when the key 1 passes the reference point Xr. Now, let us define a reference time interval Tr as "a time interval between the reference time tr and the impact time ti". The impact time ti has been already defined as a time when the hammer 2 strikes the strings 4. For this reason, the detector 7*a* is aligned with the rebounding point, and the timing data reported by the detector 7*a* is indicative of the impact time ti.

Figure 3:
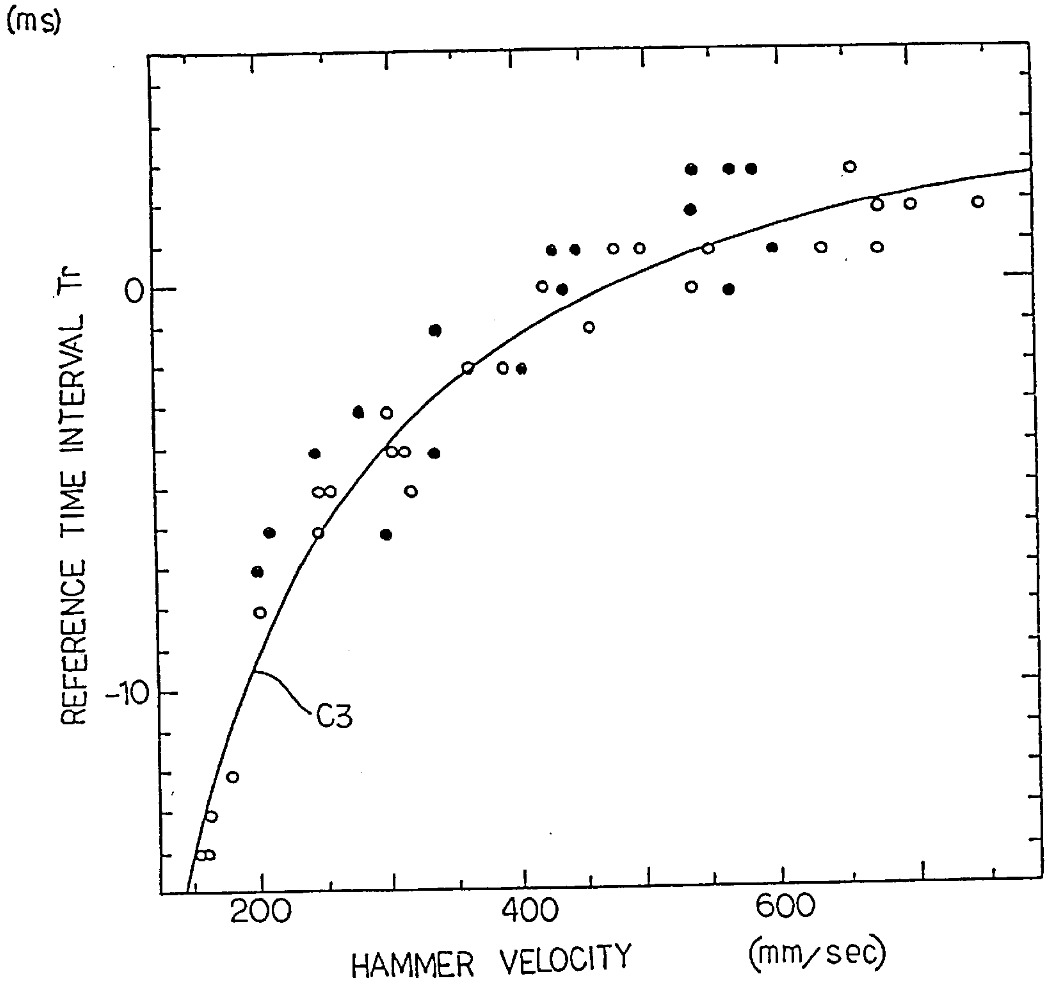
FIG. 3 is a graph showing a reference time interval in terms of the final hammer velocity.
Figure 4:
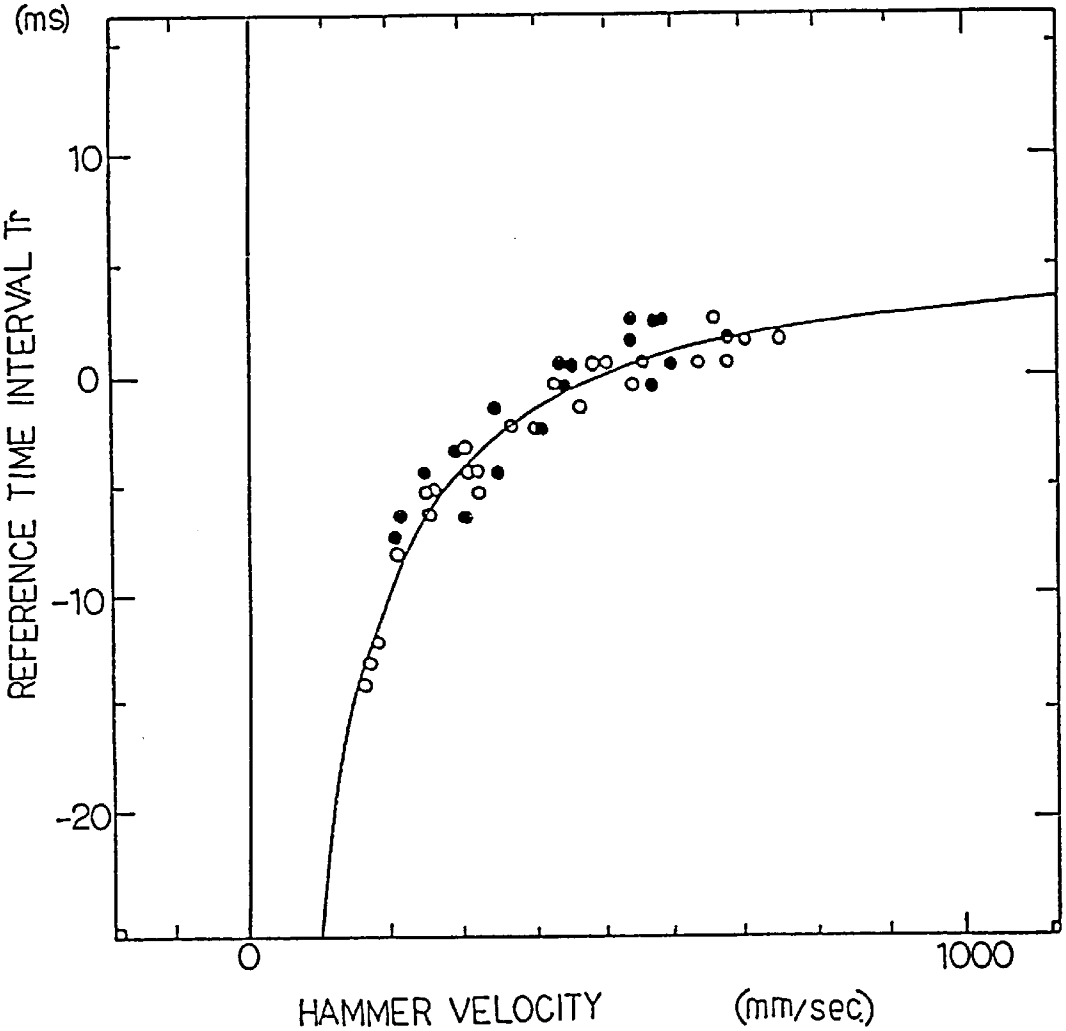
FIG. 4 is a graph showing the relation between the reference time interval and the final hammer velocity scaled up at 200 percent.
Figure 5:
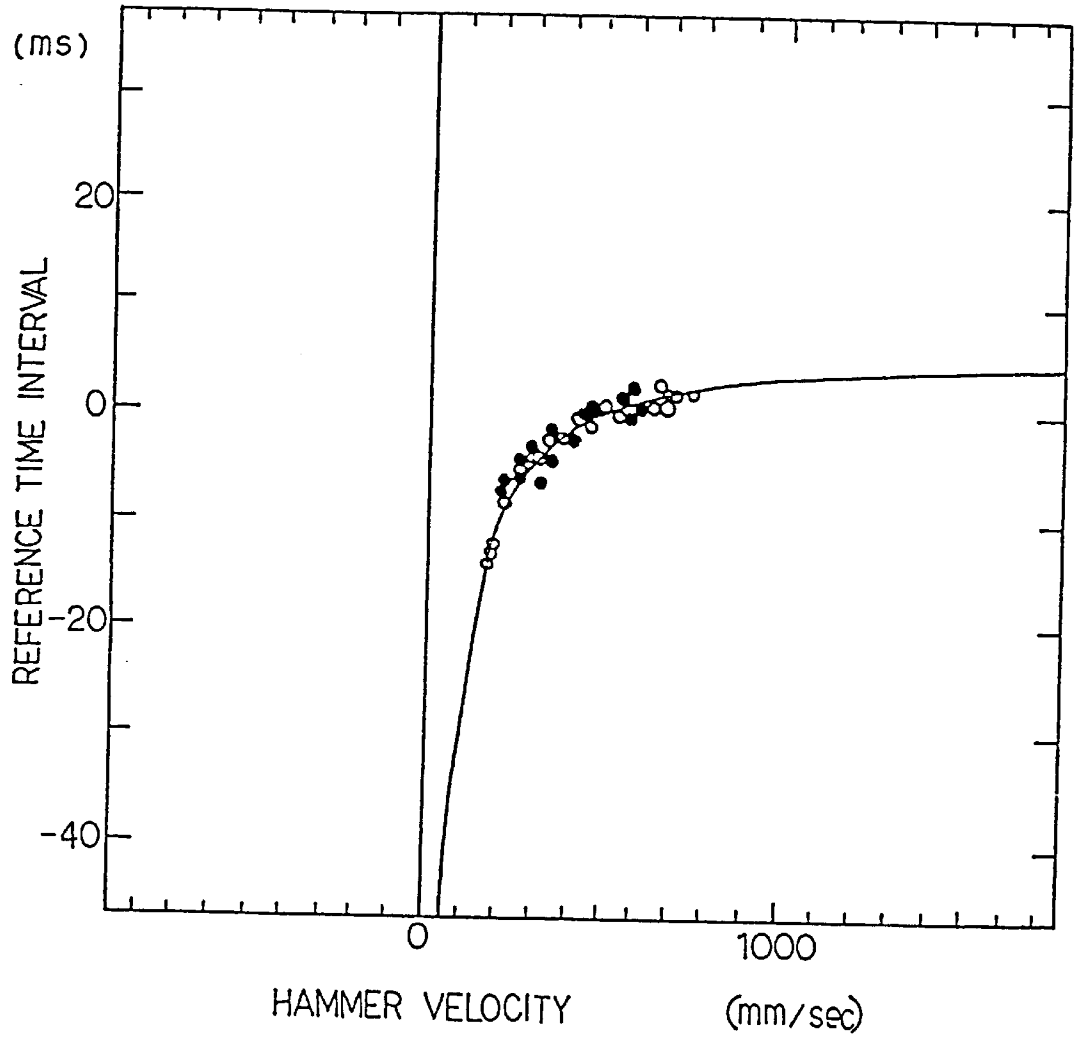
FIG. 5 is a graph showing the relation between the reference time interval and the final hammer velocity scaled up at 400 percent.

The present inventors plotted the reference time interval Tr in terms of the final hammer velocity VH in FIG. 3. Bubbles stands for the reference time intervals in the single full-stroke key motions, and dots represents the reference time intervals in the repetition as similar to FIG. 2. The relation between the reference time interval Tr and the final hammer velocity VH is scaled up at 200 percent in FIG. 4, and at 400 percent in FIG. 5. The reference time intervals Tr are approximated by a hyperbolic line C3, and is expressed as Equation 2.

$$Tr=1\ (c/VH)+d \qquad \text{Equation 2}$$

where c and d are constants, and are determined through experiments. When the reference point Xr is changed in the experiments, constants c and d are varied depending upon the reference point Xr.

If the reference time interval Tr is calculated by using Equation 2, the reference time tr is given by subtracting the reference time interval Tr from the difference between a lapse of time between a key-on time t0 of the key motion and the impact time ti. An original hammer impact is faithfully reproduced for an original sound if the key 1 is controlled in such a manner as to pass the reference point Xr at the reference time tr at the reference velocity Vr.

If the hammer 2 is arranged in such a manner as to strike the strings 4 at the reference point Xr, the reference time interval Tr is useless.

1-4: Control without Missing Data

Thus, the key 1 passing at the reference point Xr with the reference velocity Vr results in a faithful reproduction of the original sound. The present inventors form a feedback loop, and controls the key 1 through the feedback loop in accordance with a table indicating a relation between a target key position and a lapse of time from a key-on time t0. The table may be produced on the assumption that the key 1 behaves as a uniform motion, a uniformly accelerated motion or another position predictable motion. Of course, it is important to approximate the key motion to an easily controllable motion. If the approximated motion requires an acceleration, the acceleration at the reference point is calculated on the basis of the reference key velocity Vr. However, a single trajectory is desirable. For this reason, the reference trajectory is approximated to a linear line in the preferred embodiment described hereinlater.

1-5: Supplement of Dummy Event

Figure 6:
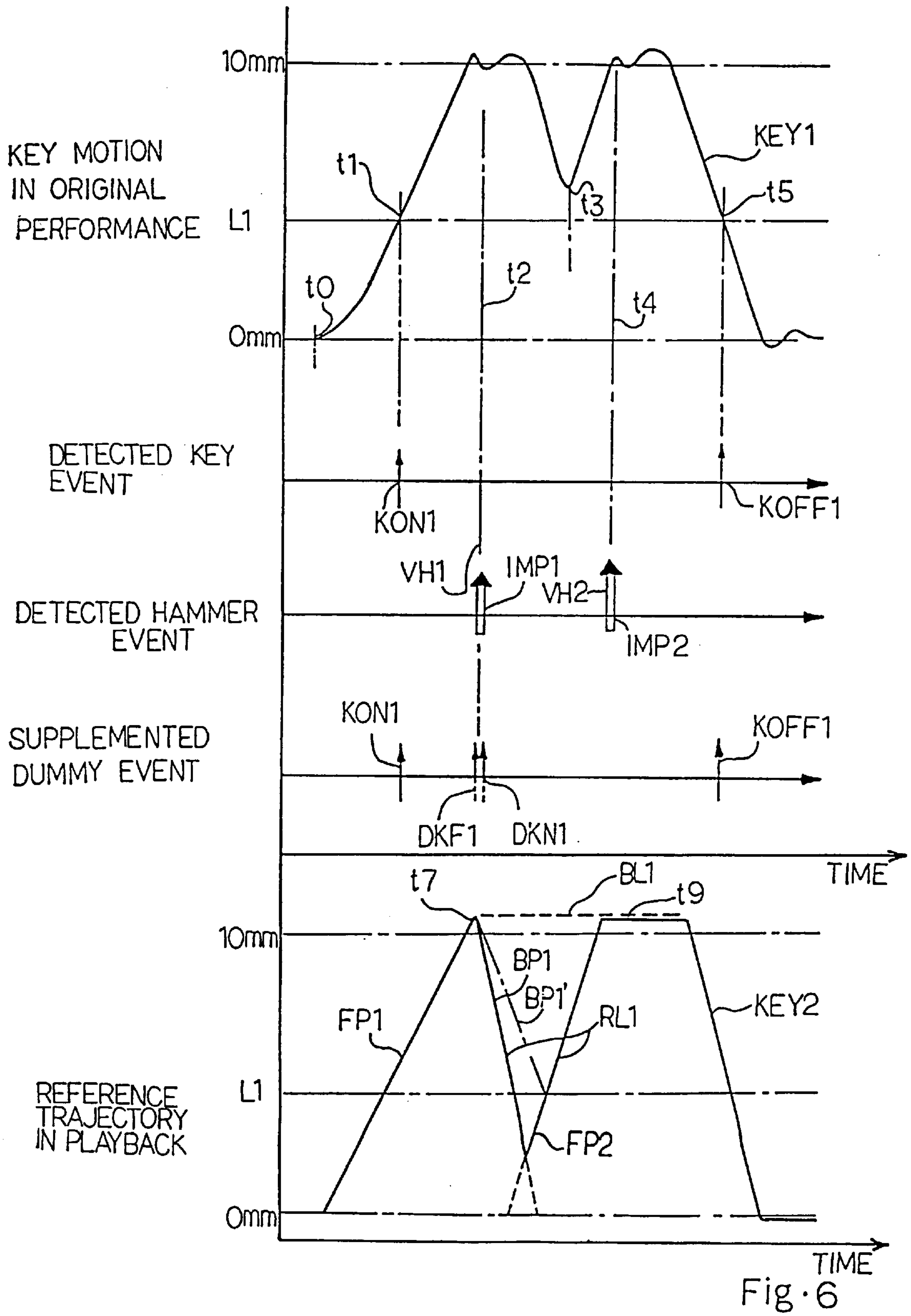
FIG. 6 is a timing chart showing an original key motion, detected key/detected hammer events, supplemented dummy key events and a reference trajectory.
Figure 7:
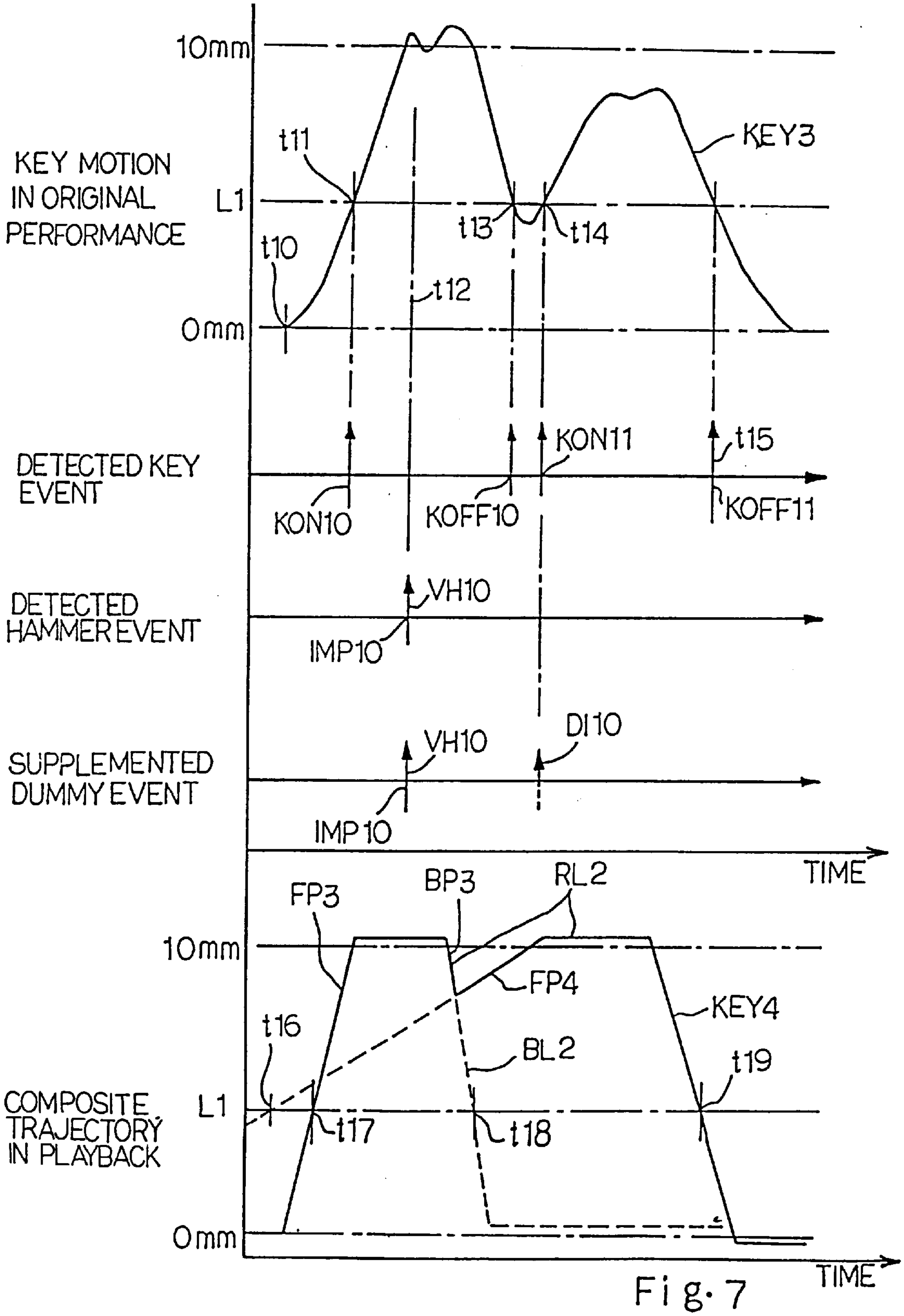
FIG. 7 is a timing chart showing another original key motion, detected key/detected hammer events, supplemented dummy key events and a reference trajectory.

While the automatic player piano is producing a series of music data codes indicative of an original performance, the data processor 9 expects the hammer sensors 7 and the key sensors 8 to exactly report the key position and the hammer position. However, it is unavoidable to miss a detection, and the data processor 9 obtains incomplete data. FIGS. 6 and 7 illustrate the supplement of dummy events according to the present invention. When a player depresses the key 1, the key 1 sinks from zero to 10 millimeters, and the key position is plotted on a line labeled with "KEY1". When the key passes a detecting point L1, the key sensor 8 detects the key 1, and the data processor 9 acknowledges a key-on event or a key-off event. On the other hand, when the hammer 2 reaches the rebounding point, the detector 7*a* detects the hammer shank, and the data processor 9 acknowledges a hammer event representative of an impact at the strings 4.

The key 1 moves downward at time t0, and passes the detecting point L1 at time t1. Then, the data processor 9 acknowledges the key-on event KON1 at time t1. The key 1 returns to the rest position around time t2. Then, the data processor 9 determines the hammer event IMP1 at time t2, and calculates the final hammer velocity VH1. The key 1 changes the direction on the way toward the rest position at time t3; nevertheless, the data processor 9 does not acknowledge the key-off event, because the key 1 does not pass the detecting point L1. The key 1 proceeds toward the end position at time t4 again, and returns toward the rest position at time t5. The detector 7*a* notices the hammer shank, and the data processor determines another hammer event IMP2 and the final hammer velocity VH2. The key 1 passes the detecting point L1 at time t5, and reaches the rest position. When the key passes the detecting point L1, the data processor 9 acknowledges the key-off event KOFF1.

Although each hammer event usually takes place between a key-on event and a key-off event, i.e., between a forward key motion and a backward key motion, the key 1 shown in FIG. 6 has the two hammer events IMP1 and IMP2 between the key-on event KON1 and the key-off event KOFF1, and a key-on event and a key-off event are missed between the key-on event KON1 and the key-off event KOFF1. The data processor 9 can not treat the irregular key motion without the supplement of the missing key-events. For this reason, the data processor 9 supplements a dummy key-off event DKF1 and a dummy key-on event DKN1 around time t2 between the key-on event KON1 and the key-off event KOFF1. As a result, the hammer events IMP1 and IMP2 respectively take place between the key-on event KON1 and the dummy key-off event DKF1 and between the dummy key-on event DKN1 and the key-off event KOFF1, and the data processor 9 correctly produces a set of music data codes on the basis of the key motion for producing the sounds.

While the automatic player piano is reproducing the music, the data processor 9 reproduces the original key motion KEY1 as indicated by Plots KEY2 in the playback mode.

The data processor 9 is further expected to supplement the dummy hammer events for the hammer action. FIG. 7 illustrates the supplement of dummy hammer events in a half stroke, and the key 1 is assumed to trace Plots KEY3.

The key 1 moves downward at time t10, and passes the detecting point L1 at time t11. Therefore, the data processor 9 acknowledges the key-on event KON10 at time t11. The key 1 returns toward the rest position about time t12, and the hammer sensor 7 detects the hammer shank. The data processor 9 acknowledges the hammer event IMP10, and determines the final hammer velocity VH10. On the way toward the rest position, the key 1 passes the detecting point L1, and the key sensor 8 detects the key 1 passing the detecting point L1, and the data processor 9 acknowledges the key-off event KOFF10.

After passing the detecting point L1, the key 1 returns and proceeds toward the end position again. The key 1 passes the detecting point L1 again at time t14, and the key sensor 8 causes the data processor 9 to discriminate the key-on event KON11.

Since the half stroke aims at an actuation of the damper 6, the depressing force is so weak that the key 1 returns toward the rest position without an impact at the strings 4.

For this reason, the hammer sensor 7 does not detect the hammer shank, and, accordingly, the data processor 9 does not determine a hammer event. The key 1 changes the direction of its motion, and the key 1 passes the detecting point L1 at time t15. Then, the key sensor 8 detects the key 1, and the data processor 9 acknowledges the key-off event KOFF11.

The key-off event KOFF11 follows the key-on event KON11 without a hammer event, and, for this reason, the data processor 9 supplements a dummy weak hammer event DI10 around time t14. The dummy weak hammer event DI10 is representative of an extremely slow hammer velocity without an impact. Thus, the set of three events, i.e., a key-on event, a hammer event and a key-off event are coded into the music data code signal, and the data processor 9 reproduces the key motion as indicated by Plots KEY4 in the playback mode.

Although the dummy key/dummy hammer events are supplemented to the music data code signal at the same time as the detected key/detected hammer events in FIGS. 6 and 7, the time for each dummy event should be appropriately modified for generating the trajectory for the key 1, and the modification is described hereinlater in detail. The reason why the dummy key/dummy hammer events are supplemented is that the lack of the key/hammer event makes it impossible to exactly determine the trajectories KEY2 and KEY4. In fact, if the dummy key-off event DKF1 and the dummy key-on event DKN1 are not supplemented, the key 1 traces the broken line BL1 instead of the real line RL1 in FIG. 6. The key 1 also traces broken the line BL2 instead of the real line RL2 without the supplement of the dummy weak hammer event DI10 in FIG. 7.

1-6: Individuality of Piano and Regulating Method

As described thereinbefore, an automatic player piano has individuality associated with what it produces, and the knowledge obtained through its learning is not necessary valid for another automatic player piano at all times. As to the key motion from the rest position toward the end portion, the present inventors investigated the influence of the piano's individuality on the above described relations. The relation between the reference velocity Vr and the final hammer velocity VH is less affected by the individuality. However, the piano's individuality has non-ignoreable influence on the reference time tr. For this reason, even if an original performance is reproduced by an automatic player piano different from the automatic player piano used for the recording, the automatic player piano used for the playback only requires a supplement to a piece of music data information representative of the reference time tr so as to modify the original reference trajectory. When a trajectory is determined on the basis of the piece of music data information recorded by another automatic player piano, the automatic player piano deviates an initial part of the trajectory to a certain timing earlier or later than the original timing, and the modified trajectory absorbs the difference in the reference time between the automatic player piano used for the recording and the automatic player piano used for the playback.

When a pianist releases a key, the key returns toward the rest position due to the self-weight, and the damper mechanism 6 has influences on the key's motion toward the rest position. The key velocity caused by the self-weight is hereinbelow referred to as "maximum released key velocity". If a released key velocity to be reproduced is smaller than the maximum released key velocity, the solenoid-operated key actuator 5 assists the key so as to decelerate it. However, if a released key velocity to be reproduced is as large as the maximum released key velocity, a wide difference takes place between the trajectory in the original performance and the trajectory in the playback due to the individuality of the servo-system. For example, when the automatic player piano for the playback does not have quick response characteristics, the damper mechanism 6 retards the timing when it is in contact with the strings 4, and the acoustic sound is undesirably prolonged. Such a trouble would frequently take place between the original performance and the playback.

The original performance is usually recorded by a professional pianist, and the professional pianist tends to increase the weight of the key so as to achieve a quick return after the release of the keys. In fact, professional pianists request a tuner to make the keys heavy before the performance, and the tuner adds pieces of lead to the rear portions of the keys. However, such a heavy key is not comfortable for amateur pianists. It is especially hard for children to quickly depress the heavy keys. User enjoy the automatic player piano for playing a tune as well as for playback of the original performance recorded by a professional pianist. For this reason, the manufacturer does not increase the weight of the keys incorporated in the commercial product. This means that the automatic player piano used for the recording has the keys heavier than the keys incorporated in the automatic player piano used for the playback, and the controller 9 is expected to modify the reference trajectory from the trajectory in the original performance. For this reason, the controller 9 starts at later part of the reference trajectory, that is a representative of the backward key motion, earlier than that in the original performance. Thus, the controller 9 changes the initial part and/or the later part to be earlier or later than those of the trajectory of the key in the original performance, and makes up the individuality of the automatic player piano. As a result, the automatic player piano according to the present invention faithfully reproduces the original performance regardless of the automatic player piano used for the recording and the playback.

1-7: Outline of Data Processing

As described thereinbefore, when the reference velocity Vr at the reference point Xr is determined, the automatic player piano can reproduce the impact at the strings 4 in the playback mode. Even if either key or hammer event is missed, the dummy hammer/dummy key event is supplemented, and any kind of key motion such as the half stroke is stably reproduced in the playback mode.

In order to determine a forward trajectory for the key 1, the data processor 9 determines the target key position for the key 1 in terms of the lapse of time from the key-on time t0, and regulates the key velocity at the reference point Xr to the reference velocity Vr. This control is achieved by a feedback control so as to match the actual key position to the corresponding target key position. The forward trajectory of the key 1 may be approximated as a linear line for a uniform key motion or a parabola for a uniformly accelerated key motion. Of course, the key motion is approximated to any kind of line exactly reproducible in the playback mode. Even if the automatic player piano used for the playback is different from the automatic player piano used for the recording, the controller 9 makes the initial part of the forward trajectory and the later part of the backward trajectory earlier and/or later than those in the original performance, and the automatic player piano according to the present invention faithfully reproduces the original performance regardless of the individuality of the automatic player piano.

2: Structure of Automatic Player Piano

Figure 8A:
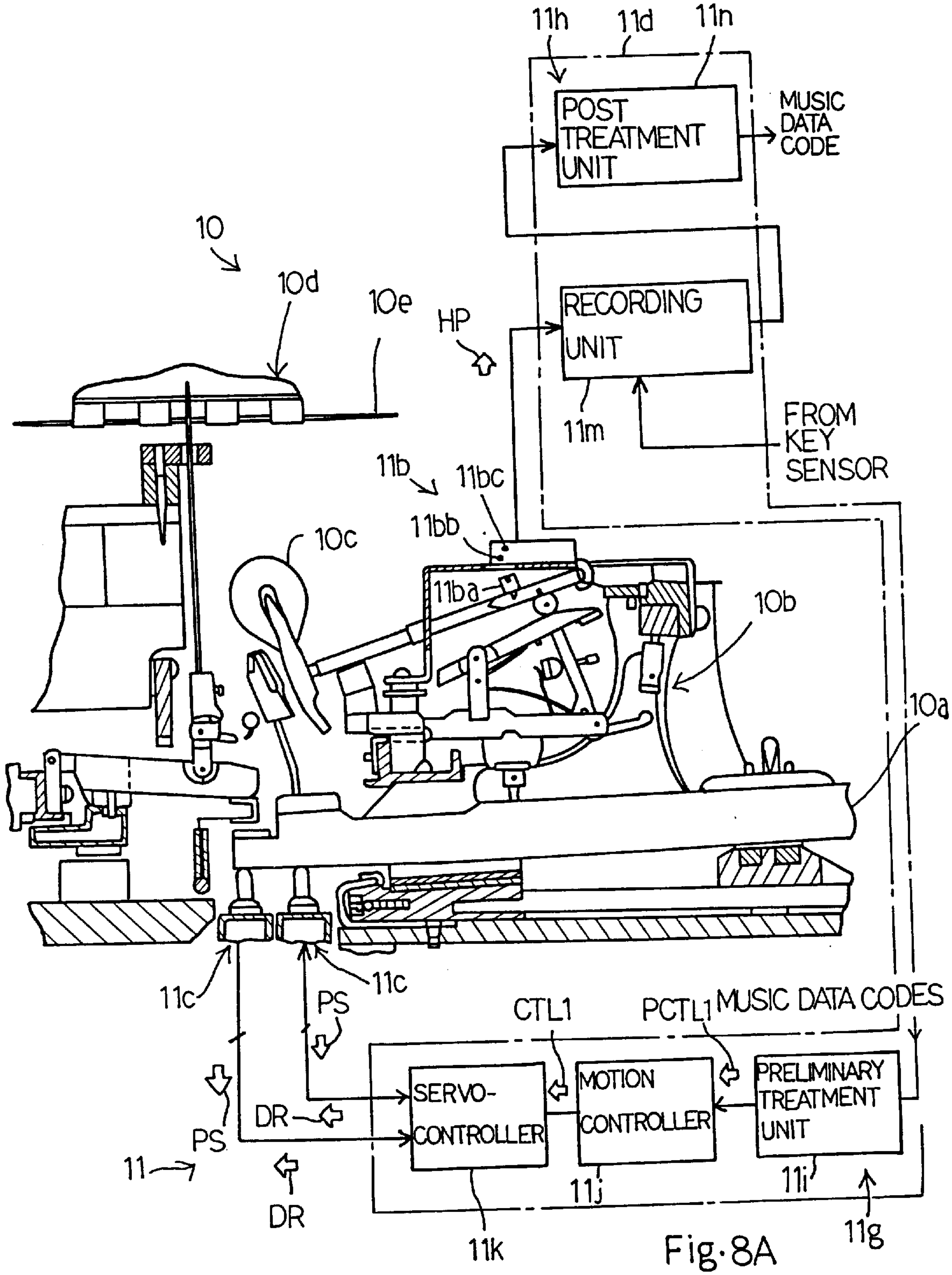
FIG. 8A is a schematic view showing an automatic player piano according to the present invention.
Figure 8B:
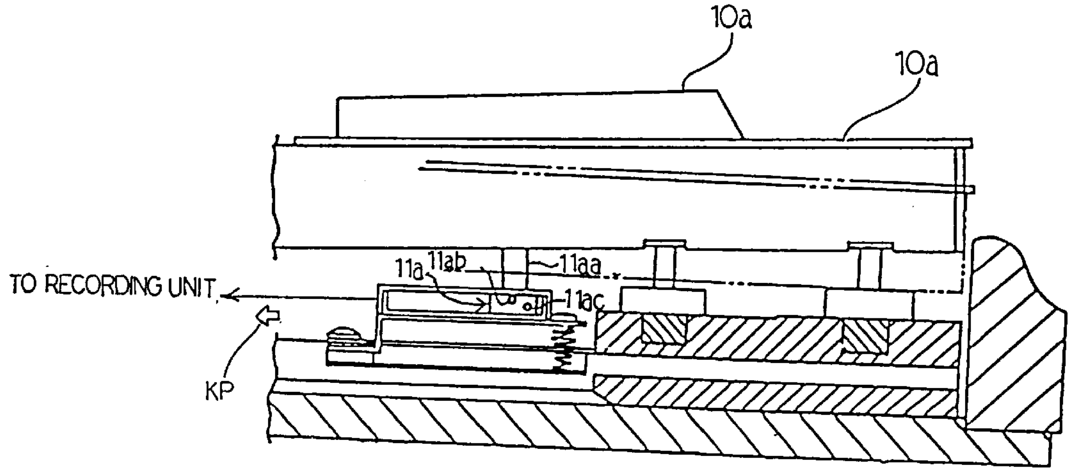
FIG. 8B is a partially cut-away side view showing a solenoid-operated key actuator and a key sensor incorporated in the automatic player piano shown in FIG. 8A.

FIGS. 8A and 8B illustrate the structure of an automatic player piano embodying the present invention, and largely comprises an acoustic piano 10 and an automatic playing system 11. The acoustic piano 10 comprises a keyboard having a plurality of keys 10*a*, a plurality of key action mechanisms 10*b* functionally connected to the keys 10*a*, respectively, a plurality of hammer assemblies 10*c* driven for rotation by the associated key action mechanisms 10*b*, a plurality of damper mechanisms 10*d* also actuated by the associated key action mechanisms 10*b* and a plurality of sets of strings 10*e* struck by the associated hammer assemblies 10*c*. The acoustic piano is basically similar to a standard grand piano, and no further description is incorporated hereinbelow for the sake of simplicity.

The automatic playing system 11 comprises a plurality of key sensors 11*a* for monitoring the keys 10*a*, a plurality of hammer sensors 11*b* for monitoring the hammer assemblies 10*c*, a plurality of solenoid-operated actuator units 11*c* for actuating the associated keys 10*a* and a controlling unit 11*d*. Each of the key sensors 11*a* detects an actual key position of the associated key 1 moved between the rest position and the end position, and supplies a key position signal KP indicative of the actual key position of the associated key 10*a* to the controlling unit 11*d*. Each of the hammer sensors 11*b* also detects an actual hammer position, and supplies a hammer position signal HP to the controlling unit 11*d*.

The key sensor 11*a* has a shutter plate 11*aa* attached to the lower surface of the key 10*a* and two photo-interrupters 11*ab*/11*ac* arranged along the trajectory of the shutter plate 11aa. The shutter plate 11*aa* successively interrupts the optical beams of the photo-interrupters 11*ab*/11*ac* during the forward key motion, and allows the photo-interrupters 11*ab*/11*ac* to successively establish the optical beams, again, during the backward key motion. The key sensor 11*a* informs the controlling unit 11*d* of the photo-interruption by using the key position signal KP.

The hammer sensor has a shutter plate 11*ba* attached to the hammer shank of the associated hammer assembly 10*c* and two photo-interrupters 11*bb*/11*bc* arranged along the trajectory of the shutter plate 11*ba*. The photo-interrupter 11*bc* is adjusted to a suitable position so as to detect the impact time ti. The shutter plate 11*ba* successively interrupts the optical beams of the photo-interrupters 11*bb*/11*bc* during the hammer's motion toward the set of strings 10*e*, and allows the photo-interrupters 11*bb*/11*bc* to successively establish the optical beams, again, during the hammer motion toward the home position. The hammer sensor 11*b* changes the hammer position signal HP at the photo-interruptions and at the evacuation therefrom. The status without photo-interruption is hereinbelow referred to as "photo-detecting state", and the status during the photo-interruption is referred to as "photo-interrupted state".

The solenoid-operated key actuator 11c has a solenoid wound on a yoke, a plunger projectable from the yoke and a velocity sensor monitoring the plunger. The controlling unit 11*d* selectively supplies a driving signal DR to the solenoid-operated key actuators 11*c* so as to energize the solenoid, and the velocity sensor supplies a plunger velocity signal PS indicative of an actual plunger velocity of the plunger to the controlling unit 11*d*.

The controlling unit 11*d* has a playback section 11*g* and a recording section 11*h*, and the playback section 11*g* and the recording section 11*h* are selectively enabled in a playback mode and a recording mode. The playback section 11*g* comprises a preliminary treatment unit 11*i*, a motion controller 11*j* and a servo-controller 11*k*. On the other hand, the recording section 11*h* includes a recording unit 11*m* and a post treatment unit 11*n*.

A series of music data code signals are sequentially supplied from a real time communication system (not shown) or an external memory system (not shown) such as, for example, a floppy disk controller to the preliminary treatment unit 11*i*.

The preliminary treatment unit 11*i* determines forward/backward trajectories for the keys 10*a* identified by the music data codes. Namely, the preliminary treatment unit 11*i* calculates the reference velocity Vr and the reference time tr for each key 10*a*, and determines the forward/backward trajectory for the key 10*a*. If a reference trajectory is approximated to an approximated trajectory such as a parabolic trajectory, the preliminary treatment unit 11*i* calculates the acceleration. The preliminary treatment unit 11*i* produces a plurality of preliminary control data signals PCTL1 to the motion controller 11*j*, and the preliminary control data signals PCTL1 are representative of the forward/backward trajectories of the keys 10*a* to be actuated by the solenoid-operated actuator units 11*c*.

The motion controller 11*j* is responsive to the preliminary control data signals PCTL1 so as to generate a plurality of control data signals CTL1 each indicative of a target plunger motion for the plunger. A series of target plunger positions form the target plunger motion, and the plunger moves the associated key 10*a* along a series of target key positions or the forward/backward trajectories in the playback mode. The motion controller 11*j* supplies the control data signals CTL1 to the servo-controlling unit 11*k*.

The servo-controller 11*k* is responsive to the control data signal CTL1 for regulating the driving signal DR to appropriate value. The servo-controller 11*k* supplies the driving signal DR to the solenoid-operated actuator units 11*c*. Each of the solenoid-operated actuator units 11*c* has the built-in velocity sensor as described thereinbefore, and the build-in velocity sensor supplies the plunger velocity signal PS indicative of the actual plunger velocity to the servo-controller 11*k*. The servo-controller 11*k* controls the amount of the driving current such that the actual plunger velocity is matched with the target plunger velocity. Thus, the solenoid-operated key actuators 11*c* are controlled such that the associated keys 10*a* passes the reference points Xr at the reference velocities Vr, and the hammer assemblies 10*c* strike the associated sets of strings 10*e* at the same intensities as those in the original performance. For this reason, the original performance is faithfully reproduced in the playback mode.

As described thereinbefore, the key sensor 11*a* detects the interruption of the optical beams, and the bit pattern of the key position signal KP is changed depending upon the actual key position. The recording section 11*h* calculates a key velocity on the basis of the key position signal KP. The key position signal KP is supplied to the recording unit 11*m*, and the recording unit 11*m* calculates a released key velocity VkN on the basis of a time interval from the photo-detecting state of the lower photo-interrupter 11*ac* to the photo-detecting state of the upper photo-interrupter 11*ab*.

When the upper photo-interrupter 11*ab* is changed from the photo-interrupted state to the photo-detecting state, the recording unit 11*m* determines a key releasing time tkN. One of the photo-interrupters of the key sensor 11*a* is aligned with the position L1 (see FIGS. 6 and 7), and the key-on event and the key-off event are detectable by means of the key sensors 11*a*.

The hammer sensor 11*b* is implemented by the photo-interrupters 11*bb* and 11*bc* spaced from each other, and is connected to the recording unit 11*m*. The photo-interrupter 11*bc* is aligned with an impact position where the hammer shank of the associated hammer assembly 10*c* starts to return due to a rebound of the hammer head on the associated set of strings 10*e*. For this reason, the hammer event is detectable by means of the photo-interrupter 11*bc* of each hammer sensor 11*b*, and the recording unit 11*d* calculates the hammer velocity VH on the basis of a time interval between interrupted state of the photo-interrupter 11*bb* and interrupted state of the photo-interrupter 11*bc*. Thus, the recording unit 11*m* produces pieces of music data information representative of the key's motion and the hammer's motion during the original performance.

The recording unit 11*m* is connected to the post treatment unit 11*n*, and supplies the pieces of music data information to the post treatment unit 11*n*. The post treatment unit 11*n* normalizes the pieces of music data information, supplements the dummy events, if necessary, and formats the normalized pieces of music data information to music data codes representative of the original performance. The music data codes are supplied to another electronic musical instrument, or are stored in a suitable data storage means.

The normalization is a process for absorbing differences due to the individuality of the automatic player piano. The final hammer velocity VH, the impact time ti, the released key velocity VkN and the key releasing time tkN are affected by the differences of the sensor position and the structural difference due to tolerances of the parts. For this reason, the manufacturer assumes a standard automatic player piano, and the final hammer velocity VH, the impact time ti, the released key velocity VkN and the key releasing time tkN are modified to those of the standard automatic player piano.

While a pianist is playing a tune on the automatic player piano, the hammer events and the key events are recorded by the recording unit 11*m*, and the pieces of music data information are normalized by the post treatment unit 11*n*. The normalized pieces of music data information are, by way of example, supplied to another automatic player piano, or are stored in a suitable data storage means such as a floppy disk.

On the other hand, while the automatic player piano is reproducing the original performance, the preliminary treatment unit 11*i* reproduces a reference trajectory for each key 10*a* to be depressed on the basis of a piece of music data information representative of the strength of the impact, and the motion controller 11*j* and the servo-controller 11*k* controls the solenoid-operated key actuator 11*c* in such a manner as to move the key along the reference trajectory. The key 10*a* passes the reference point Xr at the key velocity equal to the reference velocity Vr, and causes the associated hammer assembly 10*c* to strike the set of strings 10*e* at the strength equal to that in the original performance.

Thus, the automatic player piano introduces the controlling point called as "reference point Xr", and reproduces the key motion at the reference point Xr recorded during an original performance. If an event is missing, the automatic player piano supplements a dummy event into the pieces of music data information representative of the original performance. As a result, the automatic player piano faithfully reproduces the original performance.

3: Behavior of Automatic Player Piano 3.1: Collection of Fundamental Data

Firstly, the automatic player piano collects pieces of data information called as "fundamental data". The fundamental data defines the characteristics of an automatic player piano, and describes the relation between the reference velocity Vr, the final hammer velocity VH and the reference time interval Tr.

As described with reference to FIGS. 2 to 5, there is a correlation between the reference velocity Vr, the final hammer velocity VH and the reference time interval Tr. For this reason, the final hammer velocity VH and the reference time intervals Tr are repeatedly sampled at different reference velocity Vr under different key motions such as the full-stroke key motion and the half-stroke repetition, and the constant of an approximate curve, which represents the correlation and is calculated through the least square method. For this reason, the manufacturer forms a table representative of the relation between the reference velocity Vr and the final hammer velocity VH and another table representative of the relation between the reference velocity Vr and the reference time interval Tr, and stores these relations in a read only memory as control parameters common to all the automatic player pianos.

The control parameters are prepared by using a plurality of actual automatic player pianos, and are averaged so as to obtain the common control parameters or the fundamental data for an ideal automatic player piano. Otherwise, the theoretical values used for design may be used as the common parameters or the fundamental data. For this reason, there is no automatic player piano with the characteristics represented by the fundamental data. The ideal automatic player piano does not exist, and is hereinbelow called as "standard automatic player piano".

In the following description, words "fundamental", "actual" and "virtual" are selectively added to term "control parameters". Word "fundamental" is added to the control parameters for the standard automatic player piano, and word "actual" is added to the control parameters for commercial products of the automatic player piano. Word "virtual" is added to the control parameters used in an automatic player piano for a recording and a playback after a learning described hereinbelow.

3.2: Learning

An automatic player piano used for the recording and the playback is different in characteristics from the standard automatic player piano. For this reason, it is necessary for the automatic player piano to learn differences from the standard automatic player piano.

3.2.2: Control Parameters for Serve-System

As described thereinbefore, a built-in velocity sensor is incorporated in the solenoid-operated key actuator 11*c*, and periodically reports the actual plunger velocity to the servo-controller 11*k*. The servo-controller 11*k* compares the actual plunger velocity with a target velocity calculated from the data supplied from the motion controller 11*j*. The servo-controller 11*k* firstly multiplies the actual plunger velocity by a sensor offset value representative of the individuality of the built-in velocity sensor so as to internally normalize the actual plunger velocity. Thereafter, the normalized actual plunger velocity is multiplied by a sensor gain. For this reason, it is necessary to previously obtain the sensor offset value and the sensor gain. The sensor offset value is represented by the initial potential value produced by the built-in plunger velocity sensor at plunger velocity=zero. The sensor gain is calculated on the basis of the sensor offset value, the potential level of the plunger velocity signal PS, the key velocity during the forward key motion and the key velocity during the backward key motion. The key velocities are measured by the key sensor 11*a*. The learning results in a table vPs*vPr defining a relation between a fundamental forward key velocity vPr and a target servo forward key velocity vPs and a table vNs*vNr defining a relation between a fundamental backward key velocity vNr and a target servo backward key velocity vNs, and the tables are stored in the motion controller 11*j*.

3.2.2: Leaning of Difference in Forward Key Motion

Figure 9:
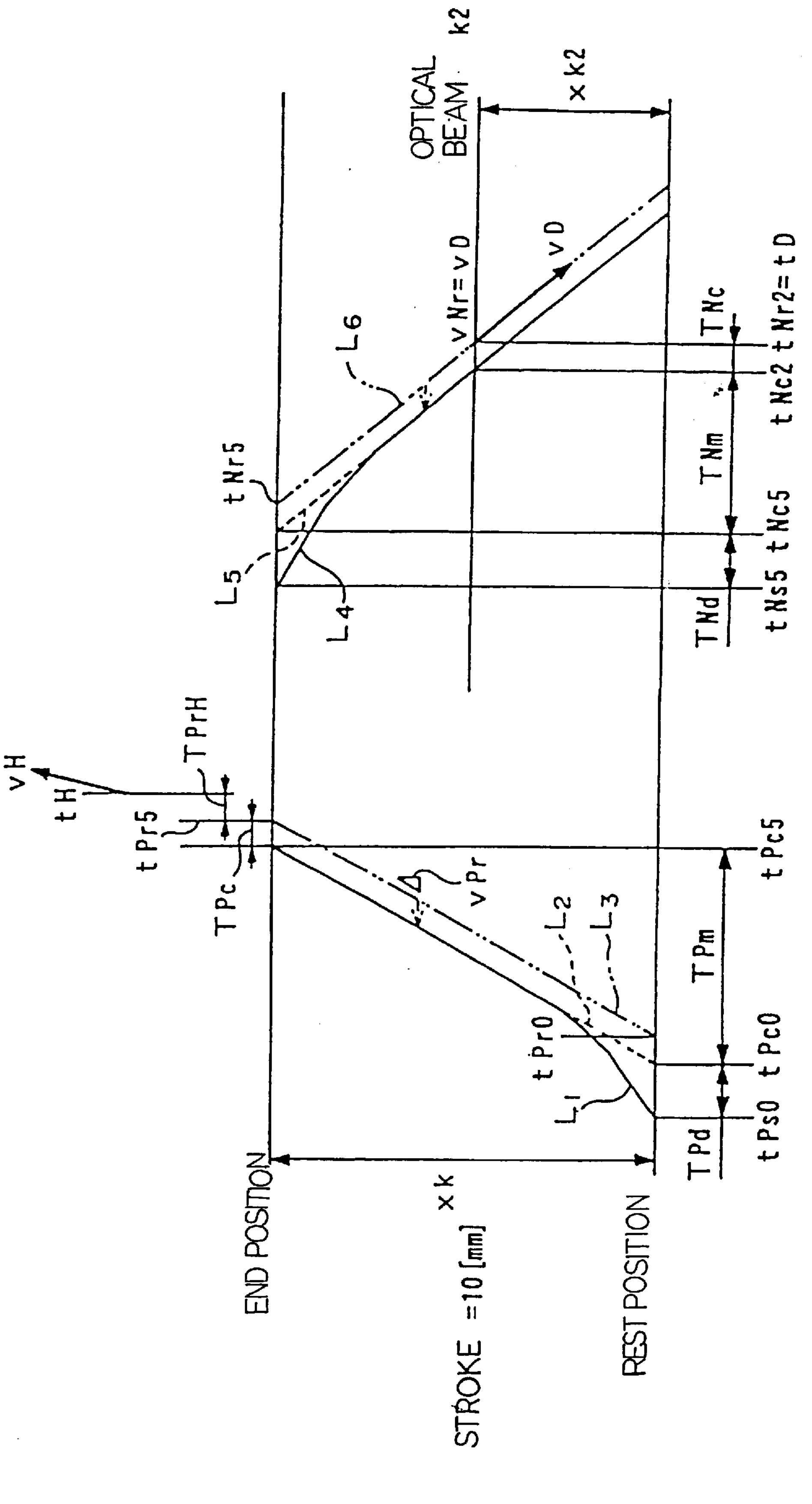
FIG. 9 is a chart showing forward key trajectories and backward key trajectories.

Subsequently, a description is made on the learning of various parameters during the forward motion of the key 10*a* with reference to FIG. 9. Assuming now that the prior art servo-controller energizes the solenoid-operated key actuator 11*a* at a target starting time tRs0 so as to move the key 10*a* at a certain forward key velocity vPr, the key 10*a* can not achieve a perfect linear motion due to the limit of the servo-controller 11*k*, and gradually increases the key velocity along an actual forward key trajectory indicated by line L1. On the other hand, the servo-controller 11*k* assumes a virtual forward key trajectory L2 aligned with the linear part of the actual forward key trajectory L1 after the non-linear initial part, and determines a virtual starting time tPc0. The key 10*a* is assumed to reach the end position at a virtual arrival time tPc5. The difference between the target starting time tPs0 and the virtual starting time tPc0 is referred to as "dead time Tpd". If the key 10*a* starts the rest position at the target starting time tPs, the key 10*a* rides on the virtual forward key trajectory L2 after the dead time Tpd.

The difference between the virtual starting time tPc and the virtual arrival time tPc5 is called as "virtual traveling time period TPm". If the key 10*a* starts the key motion along the actual forward key trajectory L1, an impact event takes place at an actual impact time tH, and the final hammer velocity is called as "actual final hammer velocity vH".

If the standard automatic player piano moves a key 10*a* from the rest position to the end position at a fundamental final hammer velocity equal to the actual final hammer velocity vH so as to strike the set of strings at a fundamental impact time equal to the actual impact time tH, the key 10*a* is moved along a fundamental forward key trajectory L3 as shown.

The fundamental forward key trajectory L3 is equal in gradient to the virtual forward key trajectory L2, and the virtual traveling time period Tpm is equal to the fundamental traveling time period. The fundamental forward key trajectory L3 crosses the rest position at a fundamental starting time tPr0, and the key 10*a* on the fundamental forward key trajectory L3 reaches the end position at a fundamental arrival time tPr5, and the fundamental arrival time tPr5 is equivalent to "reference starting time".

The difference between the virtual arrival time tPc5 and the fundamental arrival time tPr5, i.e., (tPr5−tPc5) is called an offset arrival time TPc, and the actual impact time tH is later than the fundamental arrival time tPr5 by a fundamental impact time difference TPrH. The time interval between the target starting time tPs0 and the actual impact time tH is equal to the total sum of the dead time TPd, the virtual traveling time TPm, the offset arrival time TPc and the fundamental impact time difference TPrH.

Subsequently, the present inventors investigate those control parameters to see whether or not the individuality of an automatic player piano affects those control parameters.

(1) Dead Time TPd

The dead time is affected by dispersion of the constants of the servo-controller 11*k* and the moment of inertia of the key 10*a*.

(2) Virtual Traveling Time TPm

The virtual traveling time TPm is uniquely determined from the actual final hammer velocity vH and the stroke of the key 10*a*. In this instance, the virtual forward key velocity is assumed to be equal to the fundamental forward key velocity. When the actual final hammer velocity vH is obtained, the reference velocity Vr is uniquely determined, and is equal to the virtual forward key velocity vPr. The stroke of the key 10*a* is dependent on the model of the automatic player piano.

(3) Offset Arrival Time TPc

The offset arrival time TPc is varied depending upon the individuality such as the mass of the key action mechanism 10*b* and the moment of inertia.

(4) Fundamental Impact Time Difference TPrH

The fundamental impact time difference TPrH is uniquely determined from the fundamental data representative of the actual final hammer velocity vH.

Thus, the dead time TPd and the offset arrival time TPc are varied together with the individuality of the automatic player piano. However, it is possible to assume the head time TPd to be constant, because the difference is introduced into the offset arrival time TPc. For this reason, only the offset arrival time TPc is assumed to be the object of learning for the fundamental forward key velocity.

While the automatic player piano is learning the influences of the individuality, the servo-controller 11*k* is instructed to forwardly move the key 10*a*, and supplies the driving signal DR to the solenoid-operated key actuator 11*a*. The automatic playing system 11 measures the time interval from the starting time tPs0 to the actual impact time tH, and subtracts the dead time TPd, the virtual traveling time period TPm and the fundamental impact time difference TPrH from the measured time interval so as to determine the offset arrival time TPc. The automatic player piano repeats the measurement and the calculation under different conditions, and obtains an approximate function representative of the relation between the fundamental forward key velocity vPr and the offset arrival time TPc through the least square method. The relation is stored in a table TPc*vPr.

3.2.3: Learning of Difference in Backward Key Motion

In order to strictly target the final hammer velocity and the impact time in the playback, the fundamental forward key velocity may be made different from the virtual forward key velocity. However, it is possible that a fundamental backward key velocity is equal to a virtual backward key velocity, and the automatic playing system is expected to learn individuality in timings on a time base.

Referring to FIG. 9 again, the servo-controller 11*k* is assumed to start the control of the solenoid-operated key actuator 11*c* at a target released time tNs5 as to backwardly move a key 10*a* to be released at a target backward key velocity vD. The initial part L4 of the actual backward trajectory is also non-linear due to the limit of the servo-controller 11*k*, and the initial part L4 is merged into a linear part of the actual backward key trajectory. The automatic playing system 11 images a virtual linear backward trajectory L5, which is aligned with the linear part of the actual backward key trajectory. A released key 10*a* on the virtual linear backward trajectory L5 starts the end position at a virtual starting time tNc5, and interrupts the optical beam K2 of the photo interrupter 11*ab* at a virtual arrival time tNc2.

Dead time TNd takes place between the target starting time tNs5 and the virtual starting time tNc5, and the released key 10*a* reaches the virtual backward trajectory L5 after the dead time TNd from the target starting time tNs5. If the released key 10*a* travels along the virtual backward trajectory L5 from the end position, the released key L5 reaches the optical beam K2 after a virtual traveling time TNm. A fundamental backward trajectory L6 is assumed on the basis of a fundamental value of the dead time TNd and an actual backward key velocity. A released key 10*a* on the fundamental backward trajectory L6 interrupts the optical beam K2 at a fundamental arrival time tNr2, time interval between the fundamental arrival time tNr2 and the virtual arrival time tNc2 is called an offset time TNc. The difference between an actual released time tNc2 and the fundamental arrival time tNr2 is called a fundamental time difference TNrD. The fundamental time difference TnrD is adjusted to "0".

As similar to the learning of the differences in the forward motion, the automatic playing system 11 learns the offset time TNc in terms of the fundamental backward key velocity vNr, and forms a table TNc*vNr.

3.3: Recording

Figure 10:
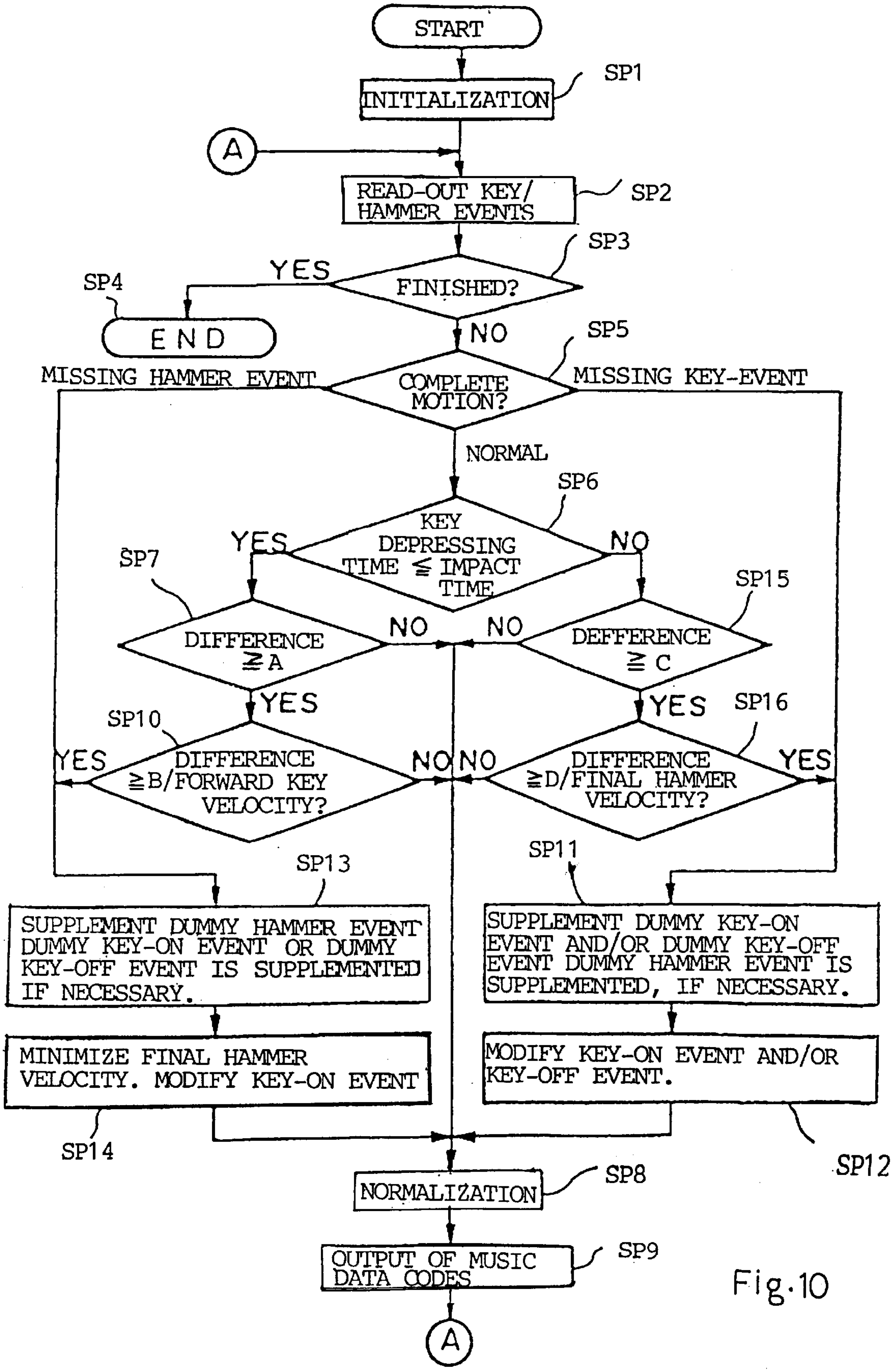
FIG. 10 is a flow chart showing a program sequence executed by a post treatment unit incorporated in the automatic player piano.

When the recording section 11*h* records an original performance, the recording unit 11*m* finds key events and hammer events during the original performance, and the post treatment unit 11*n* executes a program sequence shown in FIG. 10.

When the automatic playing system 11 is powered, the post treatment unit 11*n* starts the program sequence, and initializes the components thereof as by step SP1. Various variables are set to default values during the initialization. After the initialization, the post treatment unit 11*n* reads out the pieces of music data information representative of the key events and the hammer events from the recording unit 11*m* as by step SP2, and further reads out other pieces of music data information representative of data related to the key events and the hammer events. For example, If a piece of music data information represents a key-on event of a certain key 10*a*, the post treatment unit 11*n* searches the recording unit 11*m* for a key-off event and a hammer event of the certain key 10*a*, and the key-off event and the hammer event are read out from the recording unit 11*m*. The key-on event and the key-off event are represented by key depressing time such as time t11 in FIG. 7 and key releasing time such as time t13 in FIG. 7, and the hammer event is represented by the impact time such as time t12 in FIG. 7 and the final hammer velocity.

The post treatment unit 11*n* checks the recording unit 11*m* to see whether or not the pianist finishes the tune as by step SP3. If the performance is finished, the answer at step SP3 is given affirmative, and the post treatment unit 11*n* terminates the program sequence at step SP4. However, while the performance is being continued, the answer at step SP3 is given negative, and the post treatment unit 11*n* proceeds to step SP5.

The post treatment unit 11*n* checks the pieces of music data information read out at step SP2 to see whether or not the key events and the hammer event represent a complete key/hammer motions at step SP5. There are three possible options, i.e., "NORMAL", "MISSING HAMMER EVENT" and "MISSING KEY EVENT".

If there are a key-on event, a hammer event and a key-off event, the key/hammer motions are complete, and the post treatment unit 11*n* decides the key/hammer motions to be normal. Then, the post treatment unit 11*n* checks the key depressing time and the impact time to see whether or not the key depressing time takes place at or before the impact time as by step SP6.

When the impact time is later than the key depressing time, the answer at step SP6 is given affirmative, and the post treatment unit 11*n* proceeds to step SP7. The post treatment unit 11*n* subtracts the key depressing time from the impact time at step SP7 to see whether or not the difference is equal to or greater than value "A". Value "A" is the total of the actual difference between the key depressing time and the impact time and a certain margin, and is, by way of example, 10 milliseconds. For this reason, if the key sensor 11*a* and the hammer sensor 11*b* exactly detects the key-on event/key-off event and the hammer event, the difference is less than value "A", and the answer at step SP7 is given negative. Then ,the post treatment unit 11*n* normalizes the pieces of music data information on the basis of the learning as by step SP8, and converts the final hammer velocity, the impact time, the backward key velocity, the released time and so forth to the corresponding fundamental data of the standard automatic player piano. The post treatment unit 11*n* formats the fundamental data into music data codes, and supplies them to the outside thereof so as to store them into an information storage medium such as, for example, a magnetic disk as by step SP9.

After step SP9, the post treatment unit 11*n* returns to step SP2, and repeats the sequence described thereinbefore for another piece of music data information. If all the pieces of music data information are processed, the answer at step SP3 is changed to affirmative, and the post treatment unit 11*n* terminates the data processing.

3.3.2: Slow Depressed Key

Assuming now that a certain key 10*a* is slowly depressed during the recording, the slow forward motion makes the difference between the key depressing time and the impact time equal to or greater than value "A". In this situation, the answer at step SP7 is given affirmative, and the post treatment unit 11*n* divides value "B" by the forward key velocity to see whether the difference is equal to or greater than the quotient as by step SP10. If the difference is less than the quotient, the post treatment unit 11*n* decides the forward key motion to be slow but normal, and proceeds to step SP8. Value "B" is, by way of example, 10 mm, and the dimension "mm" is given as s·mm/s=mm.

3.3.3: Missing Key-On Event and/or Key-Off Event

As described thereinbefore with reference to FIG. 6, while a pianist repeats a half-stroke key motion, there is a possibility to fail to detect a key-on event and/or a key-off event between the hammer events. This results in a key-on event and/or key-off event missing. The post treatment unit 11n decides the key motion to be incomplete, and the job is branched from step SP5 to step SP11. The post treatment unit 11*n* supplements a dummy key-on event and a dummy key-off event to the hammer events except for the final hammer event. The dummy key-on event and the dummy key-off event are assumed to take place at the impact time of the related hammer event.

Thereafter, the post treatment unit 11*n* proceeds to step SP12, and the dummy key-on event and/or dummy key-off event are modified as follows. Even if the key-on/key-off event is missing, the hammer event provides the impact time and the final hammer velocity to the post treatment unit 11*n*, and the post treatment unit 11*n* can determines the reference velocity Vr and the reference time interval Tr on the basis of the final hammer velocity as described with reference to FIGS. 2 to 5. For this reason, it is possible to determine a linear trajectory which passes the reference point at a certain time earlier than the impact time ti by the reference time interval Tr.

In this instance, a key 10*a* is assumed to travel along a linear forward trajectory at a constant forward key velocity. The key depressing time is changed to the time when the key on the linear forward trajectory interrupts the optical beam K2, and the forward key velocity is changed to be equal to the reference velocity Vr. Thus, the dummy key-on event is modified on the assumption that the key 10*a* strikes the set of strings 10*e* through the uniform motion.

On the other hand, the dummy key-off event is modified on the assumption that the released key returns toward the rest position at the maximum backward key velocity. When a pianist spaces the finger from the key 10*a*, the self-weight makes the key 10*a* achieve maximum backward key. The key 10*a* is assumed to start the backward key motion immediately after the hammer event and move along the backward key motion with the maximum gradient. For this reason, the key released time is determined at an arrival time of the key 10*a* on the backward key trajectory at the optical beam K2. In this way, the post treatment unit 11*n* supplements the dummy key-on event and the dummy key-off event, and proceeds to step SP8.

3.3.4: Missing Hammer Event

As described thereinbefore with reference to FIG. 7, a half-stroke key motion may result in a missing hammer event as similar to the half-stroke key motion between time t14 and time t15. The read-out pieces of music data information only represent the key-on event and the key-off event, and any hammer event is not incorporated in the read-out pieces of music data information. In this situation, the post treatment unit 11*n* decides the key/hammer motions to be incomplete, and the job is branched from step SP5 to step SP13.

The post treatment unit 11*n* supplements a dummy hammer event at certain time equal to the key depressing time. Thereafter, the post treatment unit 11*n* proceeds to step SP14. The post treatment unit 11*n* minimizes the final hammer velocity of the dummy hammer event so as to not generate the acoustic sound. The post treatment unit 11*n* modifies the key-on event on the basis of the reference velocity Vr and the reference time interval Tr calculated from the final hammer velocity of the dummy hammer event. Namely, the post treatment unit 11*n* determines a linear forward trajectory, which passes the reference point at a certain time earlier than the impact time by the reference time interval Tr and has a gradient equivalent to the reference velocity Vr. When the linear forward trajectory is determined, the post treatment unit 11*n* modifies the key-on event in accordance with the linear forward trajectory. In this way, the post treatment unit 11*n* supplements the weak hammer event, and modifies the key-on event. Upon completion of the job, the post treatment unit 11*n* proceeds to step SP8.

3.3.5: Large Difference between Key Depressing Time and Impact Time

Figure 11:
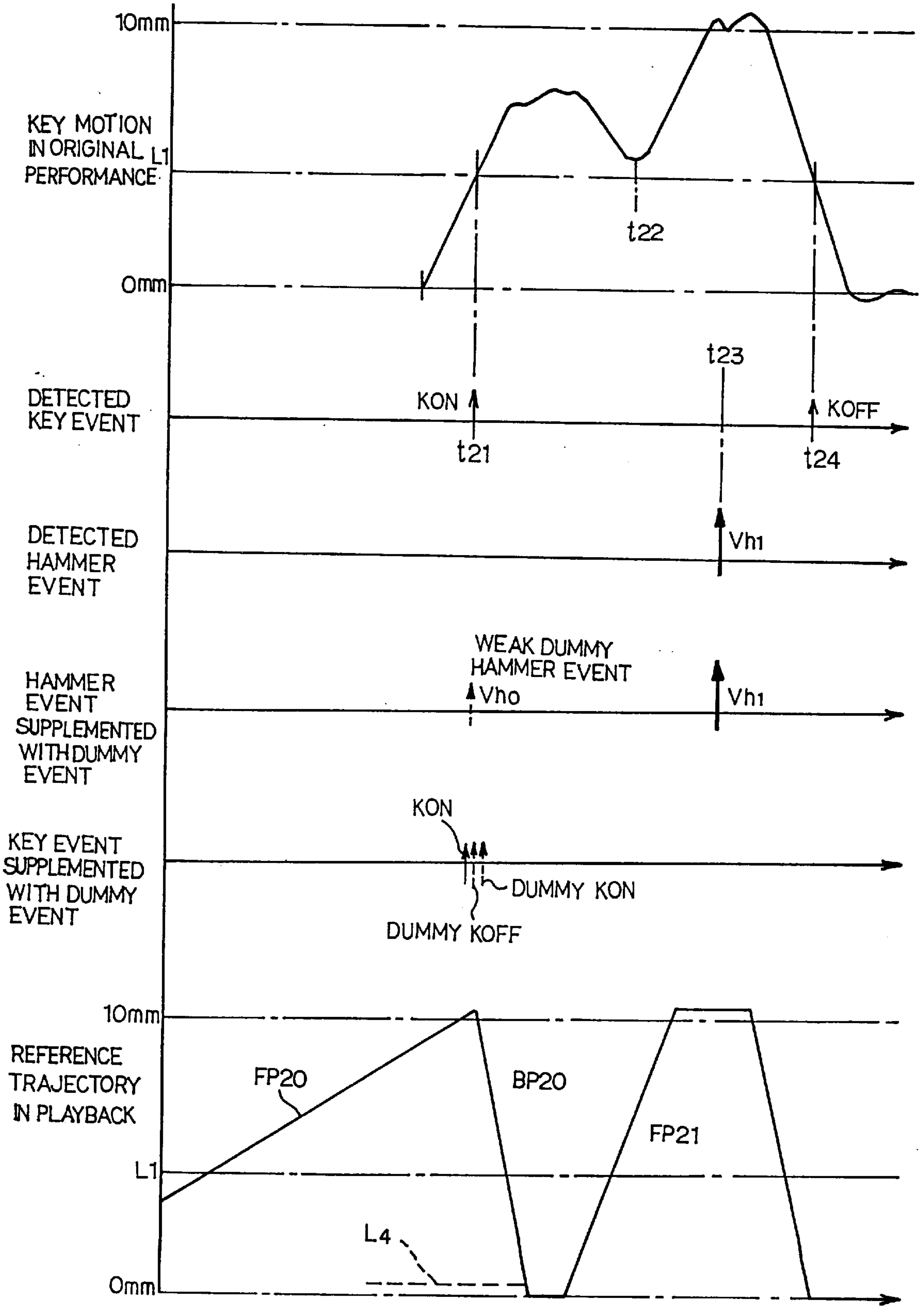
FIG. 11 is a timing chart showing an original key motion, detected key/hammer events, dummy events and a reference trajectory.

FIG. 11 illustrates a key motion, which results in a large difference between the key depressing time and the impact time. The key 10*a* starts the rest position, and reaches the photo interrupter 11*ab* at time 21. The recording unit 11*m* recognizes the key-on event at time t21. However, the key 10*a* returns toward the rest position on the way to the end position, because the pianist wants to space the damper head from the set of strings 10*e*. Any hammer event is recognized by the recording unit 10*m*. The key 10*a* merely reaches a certain position close to the photo-interrupter 11*ab*, and the pianist depresses the key at time t22, again. The key 10*a* is moved toward the end position, and the recording unit 11*m* recognizes the hammer event Vh1 at time t23. The key 10*a* returns from the end position toward the rest position, and the recording unit 11*m* recognizes the key-off event at time t24. For this reason, the hammer event Vh1 takes place between the key-on event KON at time t21 and the key-off event KOFF at time t24.

In this situation, the post treatment unit 11*n* decides the key/hammer motions to be complete, and proceeds to step SP6. The impact time t23 is after the key depressing time t21, and the answer at step SP6 is given affirmative. However, the time interval between the key depressing time and the impact time is so long that the answers at steps SP7/SP10 are given affirmative. The post treatment unit 11*n* proceeds to step SP13 as similar to the above described missing hammer event. The post treatment unit 11*n* supplements the weak dummy hammer event Vh0 at time t21. As a result, there are two hammer events Vh0 and Vh1 between the key-on event KON at time t21 and the key-off event KOFF at time t24. This is a kind of missing key event. For this reason, the post treatment unit 11*n* further supplements a dummy key-on event and a dummy key-off event at the same time as the weak dummy hammer event Vh0.

After the supplement with the dummy key events, the post treatment unit 11*n* proceeds to step SP14. The post treatment unit 11*n* minimizes the final hammer velocity of the dummy hammer event Vh0, and modifies the key-on event KON, accordingly. The dummy key-on event and the dummy key-off event are modified as similar to the missing key event. After the modification, the post treatment unit 11*n* proceeds to step SP8.

3.3.6: Impact Time Earlier than Key Depressing Time

When a pianist depresses a key 10*a* from the rest position to the end position, the hammer event takes place after the key-on event, and there is little possibility to have the impact time before the key depressing time. However, if the pianist repeats the key motion at high speed, the possibility is much larger than the simple full-stroke key motion.

In this situation, the answer at step SP6 is given negative, and the post treatment unit 11*n* compares the difference between the key depressing time and the impact time with value “C” to see whether or not the difference is equal to or greater than value “C” as by step SP15. Value “C” is, by way of example, 10 millisecond. If the answer at step SP15 is given affirmative, the post treatment unit 11*n* divides value “D” by the final hammer velocity to see whether or not the difference is equal to or greater than the quotient. Value “D” is, by way of example, 10 millimeters.

If the answer at step SP15 or SP16 is given negative, the post treatment unit 11*n* proceeds to step SP8. However, if the answers at both steps SP15/SP16 are given affirmative, the post treatment unit 11*n* assumes the hammer event to be independent from the key-on event. In detail, when a pianist repeats the key motion at high speed, the key action mechanism 10*b* and the hammer assemblies 10*c* behave unusual, and there is a possibility that an hammer event takes place in the key motion between the rest position and a certain position immediately before the photo interrupter 1lab without detection by the photo-interrupter 11*ab*. If the pianist depresses the key for spacing the damper head from the set of strings after the quick repetition, the key-on event and the key-off event take place without a hammer event, and the recording unit successively recognizes the hammer event, the key-on event and the key-off event.

In this situation, the answers at both steps SP15 and SP16 are given affirmative, and the post treatment unit 11*n* proceeds to step SP11. The post treatment unit 11*n* supplements a dummy key-on event and a dummy key-off event at the same time as the hammer event, and a weak dummy hammer event is supplemented between the key-on event and the key-off event.

If the different between the impact time and the key depressing time is smaller than value “C”, the key-on event is assumed to concern the hammer event, and supplement of a dummy event would result in unintentional key motion. For this reason, the answer at step SP15 is given negative, and the post treatment unit 11*n* proceeds to step SP8 without supplement of a dummy event.

If a key-on event is later than a hammer event, there is a problem in the determination of the reference trajectory, and it is recommendable to change the key-on event to have the key depressing time before the impact time. The post treatment unit 11*n* proceeds to step SP12, and modifies the contents of the key-on event and the contents of the key-off event.

Thus, the post treatment unit 11$n$ appropriately supplements the dummy events. The supplement of dummy events sometimes results in an event order which never occurs in an actual performance. For example, the example shown in FIG. 7 has the key-on events at time t17 immediately after the key-on event at time t16 and the key-off events at time t18 and time t19. In this situation, the alliance between the key-on event and the key-off event is unclear. For this reason, it is advisable to add a suitable tag to the key-on event and the associated key-off event. The post treatment unit 11$n$ formats the pieces of music data information into the music data codes, and are stored in a suitable data storage medium such as a hard disk or a floppy disk.

3.4: Playback 3.4.1: Control Data for Forward Key Motion

When the automatic player piano is instructed to reproduce the original performance, the music data codes are read out from the data storage medium, and are supplied to the preliminary treatment unit 11$i$. The preliminary treatment unit 11$i$ behaves as follows.

When the music data codes are supplied to the preliminary treatment unit 11$i$, the preliminary treatment unit 11$i$ checks the music data codes to see whether or not there are music data codes representative of a key-on event and an associated hammer event. When the preliminary treatment unit 11$i$ finds the music data codes representative of the key-on event and the associated hammer event, the preliminary treatment unit 11$i$ is branched into a program sequence shown in FIG. 12. Although key events and hammer events are represented by the music data codes, they are referred to as the following description without "music data codes representative of" for the sake of simplicity. The preliminary treatment unit 11$i$ assumes the reference trajectory to be linear.

Figure 12:
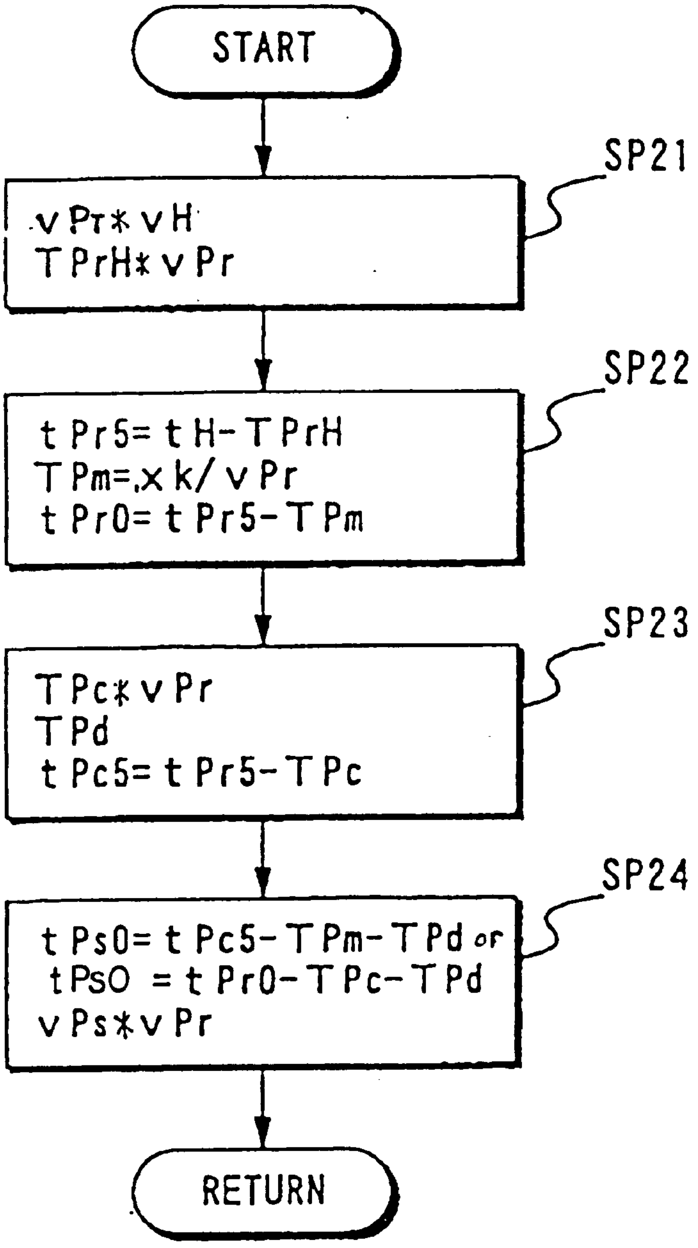
FIG. 12 is a flow chart showing a program sequence executed by a preliminary treatment unit so as to determine control data for a forward key motion in a playback.

When the execution enters into the program sequence shown in FIG. 12, the preliminary treatment unit 11$i$ firstly accesses the table vPr*vH and TPrH*vPr as by step SP21. The preliminary treatment unit 11$i$ determines the fundamental forward key velocity vPr corresponding to the final hammer velocity vH by using table vPr*vH. Table vPr*vH forms a part of the fundamental data, and defines the relation between the fundamental forward key velocity vPr and the final hammer velocity vH for the standard automatic player piano. Thereafter, the preliminary treatment unit 11$i$ accesses table TPrH*vPr, and determines the fundamental impact time difference TPrH corresponding to the fundamental forward key velocity vPr. Table TPrH*vPr also forms a part of the fundamental data, and defines the relation between the fundamental forward key velocity vPr and the fundamental impact time difference TPrH.

Upon completion of the job at step SP21, the preliminary treatment unit proceeds to step SP22, and determines the fundamental starting time tPr0 as follows. First, the fundamental impact time difference TPrH is subtracts from the actual impact time tH, and the difference is representative of the fundamental arrival time tPr5. The key 10$a$ is assumed to have the stroke xk, and the stroke xk is divided by the fundamental forward key velocity vPr, and the quotient is representative of the virtual traveling time TPm. The virtual traveling time TPm is equivalent to the fundamental traveling time. Finally, the virtual traveling time TPm is subtracted from the fundamental arrival time tPr5, and the difference is representative of the fundamental starting time tPr0.

The preliminary treatment unit 11$i$ proceeds to step SP23, and determines the virtual arrival time tPc5 as follows. First, the preliminary treatment unit 11$i$ accesses table TPc*vPr so as to determines the offset time TPc corresponding to the fundamental forward key velocity vPr. Table PTPc*vPr has been formed through the learning described thereinbefore, and defines the relation between the fundamental forward key velocity vPr and the offset time TPc. A constant value is given to the dead time TPd, and the offset time TPc is subtracted from the arrival time tPr5. The subtraction results in the virtual arrival time tPc5.

The preliminary treatment unit 11$i$ proceeds to step SP24, and determines the target starting time tPs0 and the target servo forward key velocity vPs as follows. The target starting time tPs is proposed for calculating the target starting time tPs0. The virtual traveling time TPm and the dead time TPd are subtracted from the virtual arrival time tPc5. Otherwise, the offset time TPc and the dead time TPd are subtracted from the fundamental starting time tPr0. The preliminary treatment unit 11$i$ accesses table vPs*vPr, and selects the target servo forward key velocity vPs corresponding to the fundamental forward key velocity vPr.

Thus, the preliminary treatment unit 11$i$ determines the target servo forward key velocity vPs and the fundamental starting time tPr0 through the program sequence shown in FIG. 12, and the servo-controller 11$k$ starts to control the solenoid-operated key actuator 11$c$ associated with the target key 10$a$ at the fundamental starting time tPr0 with the target servo forward key velocity vPs.

3.4.2: Trajectory for Forward Key Motion

Figure 13:
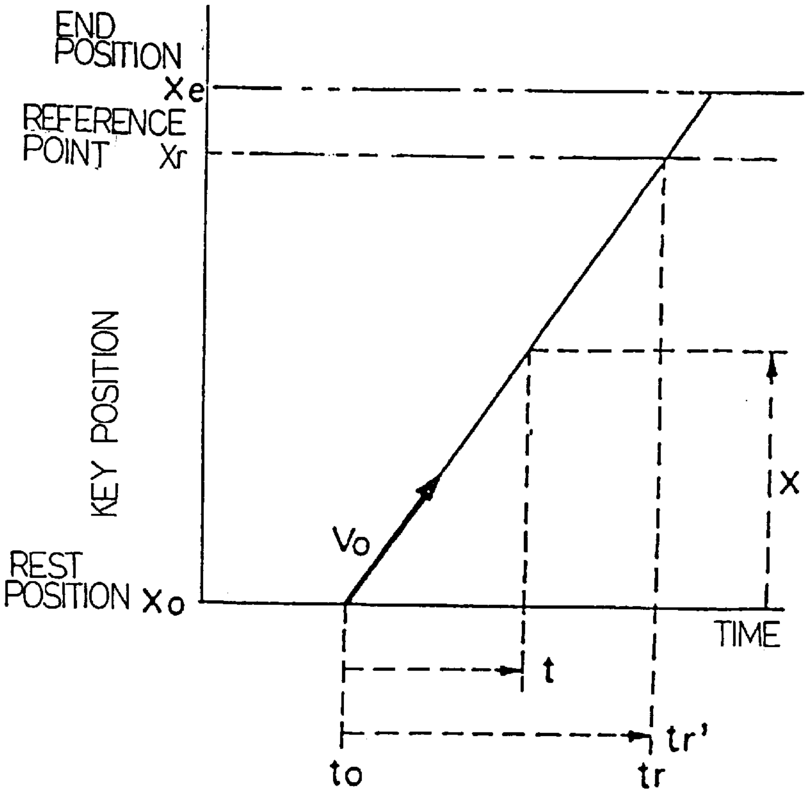
FIG. 13 is a diagram showing a trajectory for the forward key motion.

Subsequently, the description is made on a trajectory for the forward key motion. FIG. 13 illustrates the trajectory for the forward key motion. The key 10$a$ is assumed to start the rest position X0 at an initial key velocity V0. The key 10$a$ is moved through a uniform motion toward the end position Xe. The initial key velocity V0 is equal to the fundamental forward key velocity vPr. The key position X at time t is expressed by equation 3.

$$X=V0\cdot t+X0 \qquad \text{equation 3}$$

The key 10$a$ arrives at the reference point Xr at time tr', and the reference point Xr is expressed by equation 4.

$$Xr=V0\cdot tr'+X0 \qquad \text{equation 4}$$

Equation 4 gives us time tr'. The solenoid-operated key actuator 11$c$ is expected to start the forward key motion at time t0, and time t0, which is equivalent to the virtual starting time tPc0, which is given by equation 5.

$$t0=tr-tr'=tr-(Xr-X0)/V0 \qquad \text{equation 5}$$

When the reference time interval Tr is subtracted from the impact time, the difference is representative of the reference time tr. Time t0 or the virtual starting time tPc0 is calculable by using equation 5, and the key 10$a$ is moved along the trajectory expressed by equation 3. Then, the key passes the reference point Xr at reference time tr, and the forward key velocity is equal to the reference velocity Vr.

In this instance, the key 10$a$ is assumed to travel on the trajectory through the uniform motion. The forward key velocity is equal to the initial key velocity V0, and the reference velocity Vr is calculable by using equation 1. For this reason, if the solenoid-operated key actuator 10$c$ is controlled in such a manner as to move the key 10$a$ at the reference velocity Vr from the rest position X0 at time t0 calculated from equation 5, the key 10$a$ travels along the trajectory as similar to the above described control.

3.4.3: Control Data for Backward Key Motion

Figure 14:
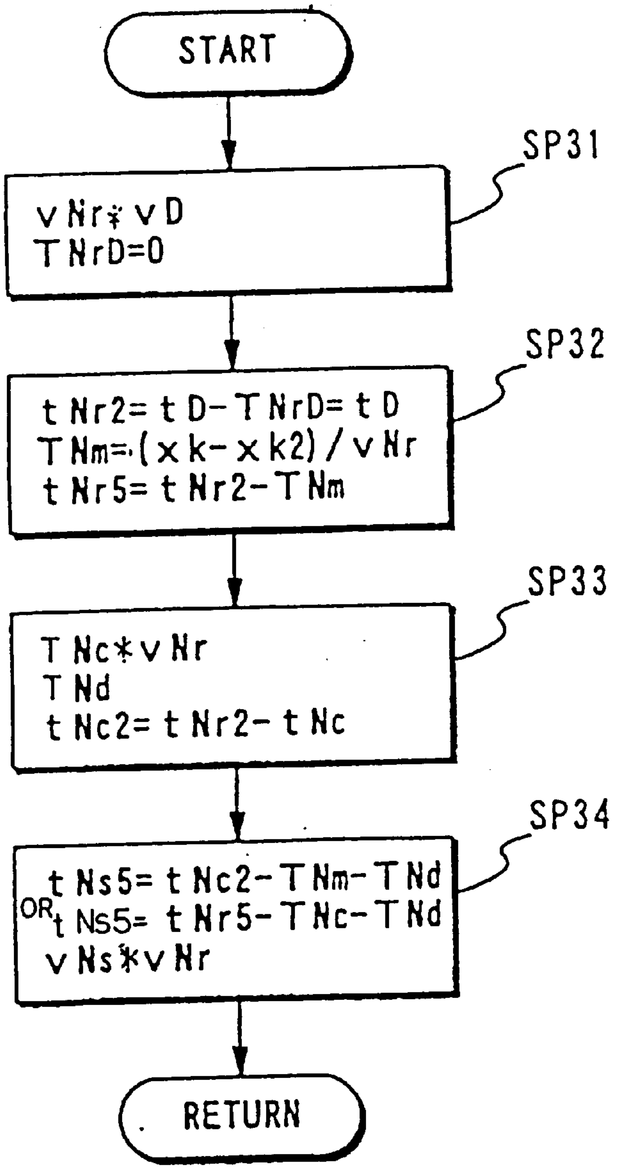
FIG. 14 is a flow chart showing a program sequence executed by the preliminary treatment unit so as to determine control data for a backward key motion in the playback.

When the preliminary treatment unit 11$i$ finds a key-off event, the preliminary treatment unit 11$i$ executes a program sequence shown in FIG. 14 as follows.

Firstly, the preliminary treatment unit 11*i* accesses table vNr*vD, and selects the fundamental backward key velocity vNr corresponding to the target backward key velocity vD as by step SP31. The target backward key velocity vD is equal to the fundamental backward key velocity vNr, and, accordingly, is represented by a music data code of the key-off event. Table vNr*vD is equivalent to a logarithmic table, and the fundamental backward key velocity vNr is obtainable through conversion from a linear scale to a logarithmic scale. The preliminary treatment unit 11*i* substitutes zero for the fundamental time difference TNrD.

The preliminary treatment unit 11*i* proceeds to step SP32, and determines the fundamental starting time tNr5 as follows. The preliminary treatment unit 11*i* subtracts the fundamental time difference TNrD from the released time tD, and the difference is representative of the fundamental arrival time tNr2. In this instance, the fundamental time difference TNrD is assumed to be zero, and the fundamental arrival time tNr2 becomes equivalent to the released time tD. The preliminary treatment unit 11*i* subtracts a distance xk2 between the rest position X0 and the position of the photo interrupter 11*ab* from the stroke xk. The distance xk2 is unique to the automatic player piano, and the difference is representative of the distance from the position of the photo-interrupter k2 to the end position Xe. The distance between the photo-interrupter 11*ab* and the end position Xe is divided by the fundamental backward key velocity vNr, and the quotient is representative of the virtual traveling time TNm. The preliminary treatment unit 11*i* subtracts the virtual traveling time TNm from the arrival time tNr2, and the difference is representative of the fundamental starting time tNr5.

The preliminary treatment unit 11*i* proceeds to step SP33, and determines the virtual arrival time tNc2 as follows. The preliminary treatment unit 11*i* accesses table TNc*vNr, and selects the offset time TNc corresponding to the fundamental backward key velocity vNr. Table TNc*vNr has been obtained through the learning of the relation between the offset time TNc and the fundamental backward key velocity vNr as described thereinbefore. The preliminary treatment unit 11*i* substitutes a constant value obtained through the learning for the dead time TNd. The preliminary treatment unit 11*i* subtracts the offset time TNc from the fundamental arrival time tNr2, and the difference is representative of the virtual arrival time tNc2.

The preliminary treatment unit 11*i* proceeds to step SP34, and determines the target servo backward key velocity vNs as follows. The preliminary treatment unit 11*i* subtracts the virtual traveling time TNm and the dead time TNd from the virtual arrival time tNc2, and the difference is representative of the target released time tNs5. Otherwise, the offset time TNc and the dead time TNd are subtracted from the fundamental starting time tNr5 so as to determine the target released time tNs5. The preliminary treatment unit 11*i* accesses table vNs*vNr, and selects the target servo backward key velocity vNs corresponding to the fundamental backward key velocity vNr.

Thus, the playback section 11*g* determines the target servo backward key velocity vNs and the target released time tNs5 through the execution of the steps SP31 to SP34. The servo-controller 11*k* starts to control the solenoid-operated key actuator 11*c* at the target released time tNs5 so as to move the key 10*a* at the target servo backward key velocity vNs.

3.4.4: Trajectory for Backward Key Motion

Figure 15:
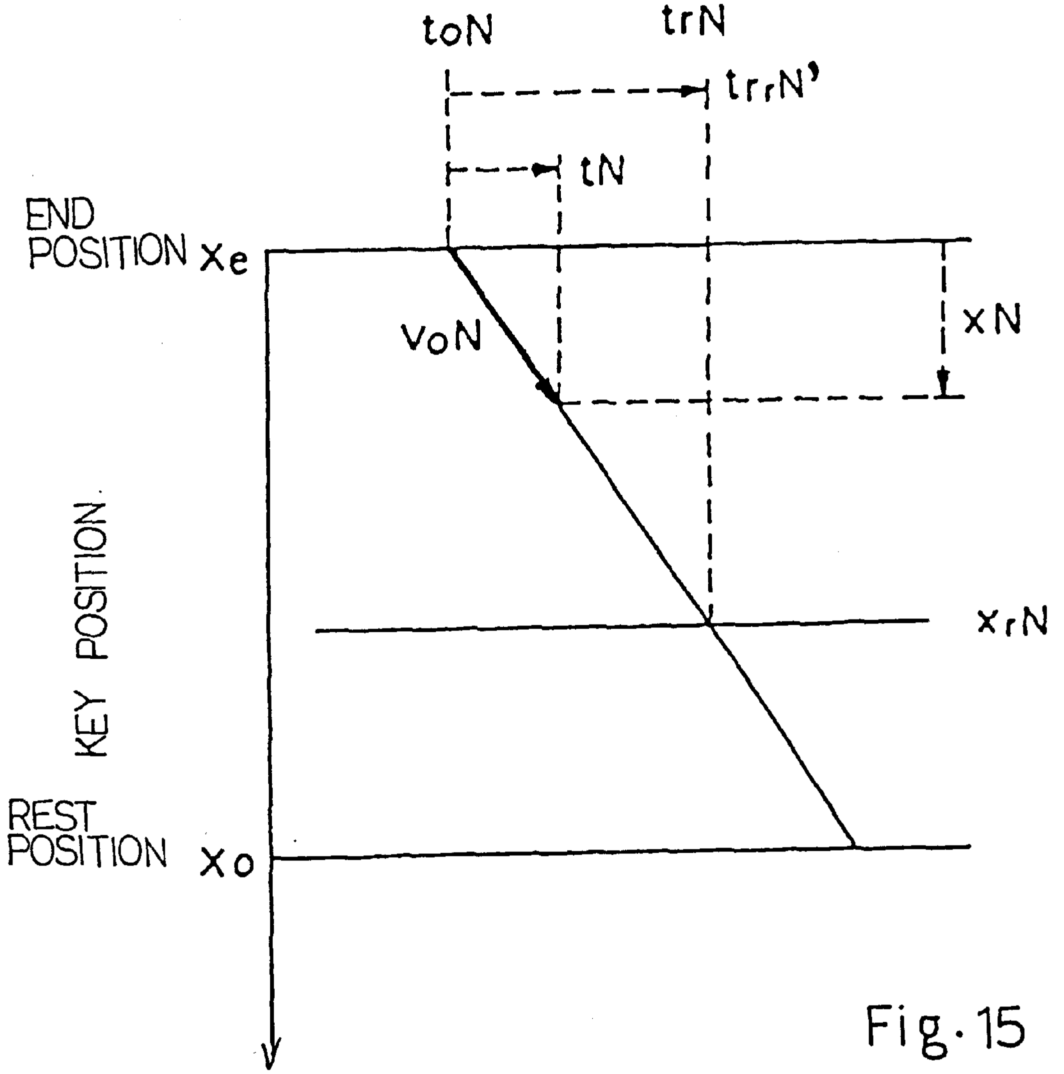
FIG. 15 is a diagram showing a trajectory for the backward key motion.

Subsequently, a description is made on a backward key trajectory for the backward key motion. A virtual backward key trajectory for the backward key motion is expressed by equation 6.

$$XN=V0N \cdot tN+Xe \quad \text{equation 6}$$

where XN is a current key position, V0N is the initial key velocity (<0), tN is the lapse of time from the stating time and Xe is the end position. The initial key velocity V0N is equal to the fundamental backward key velocity vNr, and the backward key trajectory is shown in FIG. 15.

As described thereinbefore, the recording section 11*h* determines the released key velocity vkN is on the basis of the lapse of time between the recovery to the photo-detecting state at the photo-interrupter 11*ac* and the recovery to the photo-detecting state at the photo-interrupter 11*ab*, and the released key time tkN or tD is determined at the recovery to the photo-detecting state at the photo-interrupter 11*ab*. The damper head 10*d* is brought into contact with the set of strings 10*e* at the released key time tkN. The released key velocity vkN and the released key time tkN are stored in the form of music data code, and these music data codes are read out in the playback mode.

The damper head 10*d* is regulated in such a manner as to be brought into contact with the set of strings 10*e* at a released reference point XrN, and the key 10*a* reaches the released reference point XrN at released reference time trN equivalent to the virtual arrival time tNc2. When the key 10*a* reaches the released reference point XrN, the key 10*a* is changed to the released state. If the key 10*a* is controlled in such a manner as to match the released reference time trN with the released time tkN, the key 10*a* brings the damper head 10*d* into contact with the set of strings 10*e* at the same timing as in the original performance.

Moreover, the velocity of the damper head affects the decay of the acoustic sound, and it is preferable to move the damper head at the original velocity. The velocity of the damper head is proportional to the backward key velocity vkN. For this reason, the released key 10*a* is regulated to the backward key velocity vkN at the released reference point XrN so as to faithfully decay the acoustic sound in the playback mode. The backward key velocity at the released reference point XrN is referred to as "released reference velocity VrN".

The key 10*a* reaches the released reference point XrN at time trN' measured from the starting time (=0) for the backward key motion. The released reference point XrN is given by equation 7.

$$XrN=V0N \cdot trN'+XeN \quad \text{equation 7}$$

The backward trajectory is assumed to be linear, and VON=VrN=VkN. Time trN' is calcuable on the basis of equation 7. For this reason, the starting time t0N, which is equivalent to the virtual starting time tNc5, is given by equation 8.

$$t0N=trN-trN'=trN-(XrN-XeN)/V0N \quad \text{equation 8}$$

The preliminary treatment unit 11*i* starts to control the solenoid-operated key actuator 11*c* at time t0N so as to move the key 10*a* along the backward trajectory expressed by equation 6. Then, the key 10*a* reaches the released reference point XrN at time tkN, and faithfully reproduces the decay of the acoustic sound in cooperation with the damper mechanism 10*d*.

3.4.5: Crossing Trajectory for Half-Stroke Key

Figure 16:
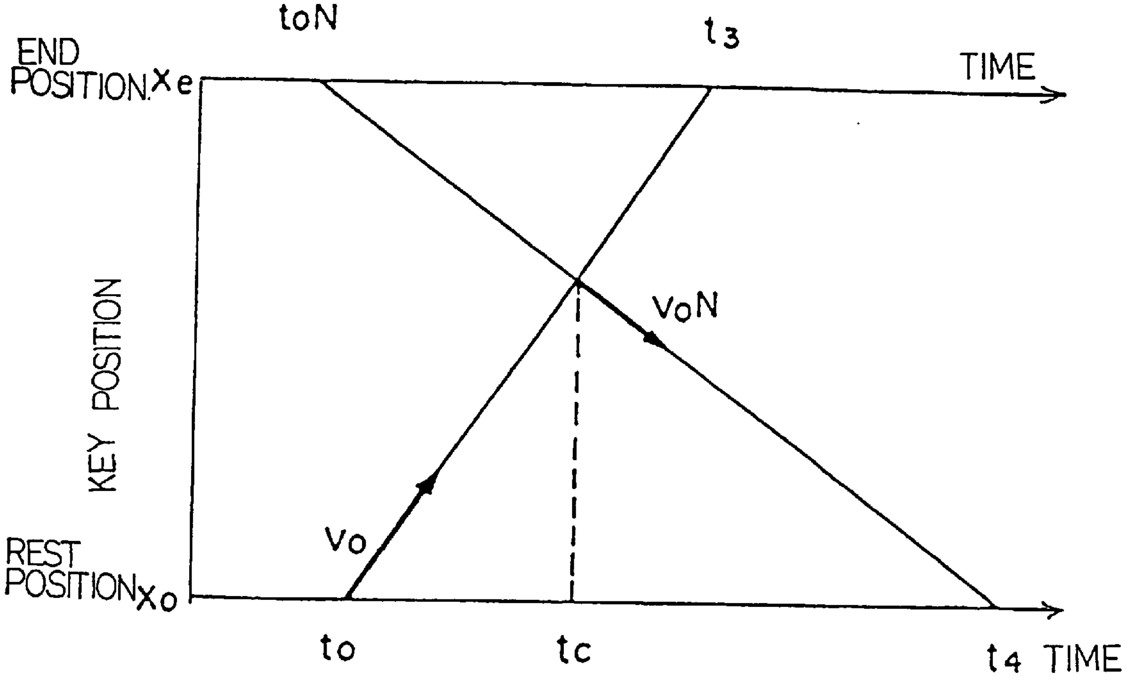
FIG. 16 is a diagram showing a crossing trajectory for a half-stroke key motion.

When a pianist releases a depressed key 10*a* on the way to the end position, a forward key trajectory crosses a backward key trajectory at an intermediate point between the rest position and the end position as shown in FIG. 16. The pianist depresses the key 10*a* from time t0 to time to, and the key 10*a* is backwardly moved from time tc to time t4. The forward key trajectory is aligned with a linear trajectory from time t0 to time t3, and the backward key trajectory is aligned with a linear trajectory from time t0N to time t4.

If time tc is given, the preliminary treatment unit 11*i* controls the solenoid-operated key actuator 11*c* so as to move the key 10*a* along the linear trajectory from time t0 to time tc and return along the linear trajectory from time tc to time t4. Time tc is expressed by equation 9.

$$tc=(V0\cdot t3-V0N\cdot toN)/(V0-VoN)t0N+V0\cdot (t3-t0N)/(V0-V0N) \quad \text{equation 9}$$

Time t3 is given by equation 10.

$$t3=t0+(Xe-Xo)/V0 \quad \text{equation 10}$$

When a pianist depresses the released key on the way to the rest position, the backward key trajectory also crosses the forward key trajectory, and the crossing time is similarly calculated. The trajectory for the half-stroke key motion is referred to as "composite trajectory".

The recording section 11h sometimes supplements the dummy events for the half-stroke key motions as described thereinbefore, and there is a possibility that the composite trajectory contains linear lines for the forward key motion crossing each other and linear lines for the backward key motion crossing each other as shown in FIG. 7. In this situation, the linear lines are compared with each other to see which linear line reaches the end position earlier, and one of the linear lines, which reaches the end position earlier than the other, is used for the forward key motion, because the selected linear line allows the key 10*a* to reproduce strong attack. On the other hand, as to the trajectory for the backward key motion, one of the linear lines, which allows the key 10*a* to be moved faster, is selected until the crossing point, and the other linear line is used for the later part of the backward key motion. In this way, the linear lines are selectively combined so as to form the composite trajectory.

When the forward/backward key trajectory is determined for the key 10*a* to be moved, the preliminary treatment unit 11*i* supplies the preliminary control data signals PCT1 representative of the forward/backward key trajectory to the motion controller 11*j*. The motion controller 11*j* determines a series of target positions X representative of a trajectory for the plunger. The motion controller 11*j* supplies the control data signal CTL1 representative of the series of target positions X to the servo-controller 11*k*, and the servo-controller regulates the magnitude of the driving signal DR in such a manner as to match an actual position of the plunger with the target position X.

3.4.6: Example of Trajectory

Referring to FIGS. 6, 7 and 11, again, the key 10*a* is moved through along the forward key trajectory FP1, and the key 10*a* continues the uniform motion until time t2. The forward key velocity is equal to the reference velocity corresponding to the hammer velocity Vh1. Thereafter, the key 10*a* returns toward the rest position along the backward key trajectory BP1 at the maximum released velocity, because the dummy key-off event is firstly supplemented at the same time as the hammer event, i.e., t2. The backward key trajectory BP1 crosses the forward key trajectory FF2 for the hammer event at time t4, and a composite trajectory is formed from the backward key trajectory BP1 and the forward key trajectory FP2.

Turning to FIG. 7, a key trajectory is formed from the key-on event at time t11, the hammer event at time t12 and the key-off event at time t13, and crosses dot-and-dash line L1 at time t17 and time t18. A weak dummy event D110 is supplemented at time t14, and a trajectory FP4 is formed. The trajectory FF4 crosses the dot-and-dash line L1 at time t16, and has a small gradient. The trajectory FP4 crosses the backward key trajectory BP3, and a composite trajectory is formed therefrom.

Turning to FIG. 11, a key 10*a* is moved along the forward key trajectory FP20, and the forward key trajectory FP20 continues until time t21, because the weak hammer event is supplemented at time t21. The key 10*a* changes the direction at time t21, and returns toward the rest position at the maximum released key velocity along the backward key trajectory BP20. The hammer event takes place at time t23, and the forward key trajectory FP21 is produced for the hammer event at time t23. The forward key trajectory FP21 is equal to the reference velocity corresponding to the hammer velocity Vh1. The forward key trajectories FP20/FP21 do not cross the backward key trajectory BP20, and any composite trajectory is not formed.

3.4.7: Behavior in Playback

Firstly, the preliminary treatment unit 10 reads out the music data codes from the data information storage medium, and determines a forward key trajectory on the basis of the pieces of music data information representative of the impact time and the final hammer velocity.

The preliminary treatment unit 11*i* supplies the pieces of control data information representative of the forward key velocity to the motion controller 11*j*. The motion controller 11*j* determines a series of target plunger positions on the basis of the pieces of control data information. The motion controller 11*j* informs the servo-controller 11*k* of the series of the target plunger positions, and the servo-controller 11*k* calculates the target plunger velocity. The plunger velocity signal PS representative of the current velocity of the plunger is supplied from the solenoid-operated key actuator 11c to the servo-controller 11*k*, and the servo-controller 11*k* compares the target velocity with the current plunger velocity so as to control the velocity of the plunger.

Subsequently, the preliminary treatment unit 11*i* determines a backward key trajectory on the basis of the pieces of music data information representative of the released time and the released key velocity, and supplies the pieces of control data information representative of the backward key velocity to the motion controller 11*j*. The motion controller 11*j* informs the servo-controller 11*j* of the series of target positions, which achieves the fundamental backward key velocity vNr at the target released time tNs5. The servo-controller 11*k* regulates the driving signal DR so as to move the key 10*a* along the virtual backward key trajectory.

When the pieces of music data information represent the complicated key motion indicative of a repetition, the forward key trajectories cross the backward key trajectories. The preliminary treatment unit 11*i* calculates the crossing time tc, and produces the composite trajectory. The preliminary treatment unit 11*i* changes the contents of the control data signal PCT1 between the forward key trajectory and the backward key trajectory at the crossing point tc, and supplies the control data signal PCT1 to the motion controller 11*j*. As a result, the key 10*a* is moved along the part of the forward key trajectory, and is switched to the part of the backward key trajectory at the crossing time tc and vice versa. In this way, the half-stroke motion is reproduced.

4: Effects

As will be understood from the foregoing description, the individual automatic player piano learns the differences from the standard automatic player piano so as to determine the dead time TPd and TNd and form tables TPc*vPr, vPs*vPr, TNc*vNr and vNs*vNr. The learning is rather simple, and the automatic player piano can completes the learning within short time. Moreover, the memory capacity for storing the differences is rather small, and the automatic player piano is reduced in production cost.

Thus, the automatic player piano according to the present invention is equipped with a data converter, which stores the first characteristics common to automatic player pianos and the second characteristics unique to the automatic player piano and obtained through the learning so as to define the converting characteristics. The automatic player piano is expected to learn only the second sub-characteristics for faithful reproduction of an original performance, and the learning is rather simple.

5. Modifications

Although a particular embodiment of the present invention has been shown and described, it will be obvious to those skilled in the art that various changes and modifications may be made without departing from the spirit and scope of the present invention.

For example, the forward key trajectory and the backward key trajectory may be represented by parabolic curves. In fact, when a pianist gently depresses a key, the key tends to be moved along a parabolic curve, and a linear forward trajectory is not appropriate to the reproduction of the key motion. For this reason, it is recommendable to assume a key motion at "pppp" to be a parabolic trajectory. In this instance, the preliminary treatment unit 11*i* compares the final hammer velocity with a threshold value so as to determine the kind of trajectory, i.e., a linear trajectory or a parabolic trajectory for the key motion to be reproduced. When a key motion is assumed to be a parabolic curve, the preliminary treatment unit 11*i* calculates the acceleration as taught by Japanese Patent Application No. 6-79604.

The servo-controller 11*k* may regulate the driving current so as to match the current plunger position with the target plunger position as taught by Japanese Patent Application No. 6-79604. In this instance, a position sensor is incorporated in the solenoid-operated key actuator 11*c*.

What is claimed:

1. A data converter having certain converting characteristics from first music data representative of a performance to second music data for use a given automatic player piano, said converting characteristics being defined by:

first data information common to automatic player pianos and containing a first parameter indicative of a relationship between a forward key velocity and an impact time and a second parameter indicative of a relationship between said forward key velocity and a final hammer velocity; and second data information unique to said given automatic player piano and containing results obtained through learning:

a) a difference between a forward key trajectory produced from said first parameter and a virtual forward key trajectory targeted by said automatic player piano;

b) a time difference between a starting timing of a depressed key moved along said virtual forward key trajectory and an actual key depressing timing in order to cause said forward key trajectory of said automatic player piano to converge to said virtual forward key trajectory;

c) a difference between a backward key trajectory produced from said first parameter and a virtual backward key trajectory targeted by said automatic player piano; and d) a time difference between a virtual releasing timing of a released key moved along said virtual backward key trajectory and an actual key releasing timing in order to cause said backward key trajectory of said automatic player piano to converge to said virtual backward key trajectory.

2. An automatic player piano comprising:

a keyboard including plural keys independently moved between respective rest positions and respective end positions, and respectively assigned notes of a scale;

strings to be struck for generating acoustic sounds with said notes;

action mechanisms respectively connected to said plural keys and selectively actuated by depressed keys of the said keyboard;

hammers selectively driven for rotation by said depressed keys for striking said strings;

actuators respectively associated with said plural keys, and responsive to first pieces of music data representative of target forward key trajectories for said depressed keys so as to selectively move said plural keys along said target forward key trajectories for striking said strings without a fingering; and a controller including:

a) a source of music data for supplying second pieces of music data representative of a performance on another automatic player piano, said second pieces of music data being indicative of strikes against strings for producing said acoustic sounds in said another automatic player piano, each of said strikes being defined by a final hammer velocity and a first timing for the strike against the string; and b) a data converter having;

a data storage storing first pieces of fundamental data obtained in said another automatic player piano for defining a first relation between a forward velocity at reference points on the forward trajectories to be traced by the depressed keys and a first delay time between said first timing and a second timing as said reference points, and a second relation between said final hammer velocity and said forward key velocity;

c) a learning means for determining an individuality of said automatic player piano and storing said individuality in the form of first pieces of individual data representative of a velocity difference between fundamental forward key velocities estimated for said another automatic player piano and actual forward key velocities measured in said automatic player piano, and a time difference between fundamental forward key trajectories estimated for said another automatic player piano and actual forward key trajectories measured for said automatic player piano; and d) a data modifier connected to said source of music data, said data storage and said learning means and producing said first pieces of music data information from said second pieces of music data information by using said first pieces of fundamental data and said first pieces of individual data.

3. The automatic player piano as set forth in claim 2, in which said time difference is indicative of;

a first delay time between an actual starting time at the rest position for each of said keys moved on the actual forward key trajectory and a virtual starting time of each of said keys estimated on the basis of an intermediate portion of said actual forward key trajectory; and a second delay time between a virtual arrival time at said end point for each of said keys moved on said actual forward key trajectory and an arrival time at said end point of the fundamental forward key trajectory for each of said keys.

4. The automatic player piano as set forth in claim 2 further comprising dampers respectively linked with said action mechanisms so as to allow said strings to vibrate and, thereafter, extinguish said acoustic sounds;

said actuators are further responsive to third pieces of music data also representative of target backward key trajectories;

said source of music data further supplies fourth pieces of music data representative of a performance on said another automatic player piano, said fourth pieces of music data are indicative of the extinguishment of said acoustic sounds in said another automatic player piano;

said data storage further stores second pieces of fundamental data obtained in said another automatic player piano for producing fundamental backward key trajectories;

said learning means further stores said individuality in the form of second pieces of individual data representative of;

another velocity difference between fundamental backward key velocities estimated for said another automatic player piano and actual backward key velocities measured in said automatic player piano and another time difference between the fundamental backward key trajectories estimated for said another automatic player piano and actual backward key trajectories measured for said automatic player piano, and a data modifier further produces said third pieces of music data from said fourth pieces of music data by using pieces of said first and said second pieces of fundamental data and said first and said second pieces of individual data.

* * * * *